United States Patent
Menzies et al.

(10) Patent No.: US 6,503,855 B1
(45) Date of Patent: Jan. 7, 2003

(54) LAMINATED COMPOSITES

(75) Inventors: Robert H. Menzies, Hudson, WI (US); Jason L. Edgar, Inver Grove Heights, MN (US); Scott J. Tuman, Woodbury, MN (US); David L. Seidel, Woodbury, MN (US); Robert J. Maki, Hudson, WI (US); John E. Riedel, Hugo, MN (US); Eugene G. Joseph, Vadnais Heights, MN (US); Leon Levitt, Mendota Heights, MN (US); Brandon T. Berg, West Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/444,349

(22) Filed: Nov. 19, 1999

Related U.S. Application Data

(63) Continuation-in-part of application No. 09/165,672, filed on Oct. 2, 1998, now abandoned, which is a continuation-in-part of application No. 09/257,447, filed on Feb. 25, 1999, now abandoned.

(51) Int. Cl.[7] .............................. B32B 5/26; D04H 1/56; A61F 13/02
(52) U.S. Cl. ..................... 442/328; 442/329; 442/366; 442/381; 442/382; 442/389; 442/392; 442/400; 442/401; 442/409; 442/149; 442/35; 442/36; 428/99; 428/100; 24/442; 24/452; 602/41; 602/42; 602/45; 602/57; 602/58
(58) Field of Search .............................. 442/328, 329, 442/366, 381, 382, 389, 392, 400, 401, 409, 149, 35, 36; 602/41, 42, 43, 45, 57, 58, 900; 24/442, 452, 447, 448, 444; 428/99, 100

(56) References Cited

U.S. PATENT DOCUMENTS 3,480,502 A    11/1969  Schrenk ..................... 156/271

(List continued on next page.)

FOREIGN PATENT DOCUMENTS

AU    B-14096/92    6/1992

(List continued on next page.)

OTHER PUBLICATIONS

DuPont Brochure for Lycra® XA® MDXA Technology—Machine Directional Stretch Product, (Apr. 1998).
DuPont Brochure for Lycra® XA® CDXA Technology—Cross Directional Stretch Product, (Apr. 1998).
"Instruction Manual for Handle–O–Meter" Model No. 211–300, Serial No. 46493, Thwing–Albert Instrument Company, TWX 710–670–1763.
"Standard Test Method for Tensile Strength and Elongation of Pressure–Sensitive Tapes", Designation: D 3759/D 3759M–96, pp. 439–444.

(List continued on next page.)

*Primary Examiner*—Cheryl A. Juska
(74) *Attorney, Agent, or Firm*—John A. Burtis

(57) ABSTRACT

A laminated composite suitable for use in medical products such as tapes and wraps. The composite includes, for example, a first nonwoven fiber layer, an elastic layer, a melt blown adhesive fiber layer, and a second nonwoven fiber layer. A scrim layer serves as a deadstop, or stretch limit, to prevent over stretching. The non-woven fiber layer(s) and/or the scrim layer form suitable loops for a hook and loop fastening system. The scrim layer in some embodiments is employed to make the composite finger tearable. The melt blown adhesive layer, nonwoven web layer and elastic layer form a breathable, porous elastic composite. Methods of manufacturing the composite are also disclosed.

28 Claims, 10 Drawing Sheets

U.S. PATENT DOCUMENTS

| | | | | |
|---|---|---|---|---|
| 3,487,505 A | | 1/1970 | Chisholm et al. ............... 18/13 |
| 3,575,782 A | | 4/1971 | Hansen ........................ 161/141 |
| 3,616,129 A | | 10/1971 | Sager ........................... 161/57 |
| 3,825,379 A | | 7/1974 | Lohkamp et al. .............. 425/72 |
| 3,849,241 A | | 11/1974 | Butin et al. .................. 161/169 |
| 4,056,593 A | | 11/1977 | de Navas Albareda ..... 264/145 |
| 4,207,885 A | * | 6/1980 | Hampton et al. ........... 128/156 |
| 4,209,563 A | | 6/1980 | Sisson ........................ 428/288 |
| 4,349,020 A | | 9/1982 | Krikorian ................... 128/155 |
| 4,424,808 A | | 1/1984 | Schafer et al. .............. 128/156 |
| 4,427,737 A | | 1/1984 | Cilento et al. ........... 428/315.7 |
| 4,522,863 A | | 6/1985 | Keck et al. ................. 428/196 |
| 4,619,654 A | * | 10/1986 | Abplanalp ................. 604/897 |
| 4,679,519 A | | 7/1987 | Liuville ...................... 114/103 |
| 4,699,133 A | | 10/1987 | Schafer et al. .............. 128/156 |
| 4,741,949 A | | 5/1988 | Morman et al. ............ 428/224 |
| 4,863,779 A | | 9/1989 | Daponte ..................... 428/152 |
| 4,959,265 A | | 9/1990 | Wood et al. ................ 428/343 |
| 4,977,011 A | | 12/1990 | Smith ......................... 428/152 |
| 4,984,584 A | | 1/1991 | Hansen et al. .............. 128/898 |
| 5,077,870 A | | 1/1992 | Melbye et al. ................ 24/452 |
| 5,116,662 A | | 5/1992 | Morman ..................... 428/198 |
| 5,133,199 A | | 7/1992 | Parikh et al. .................. 66/192 |
| 5,153,049 A | | 10/1992 | Gorshens .................... 428/196 |
| 5,209,801 A | | 5/1993 | Smith ......................... 156/161 |
| 5,219,633 A | * | 6/1993 | Sabee ......................... 428/109 |
| 5,226,992 A | | 7/1993 | Morman ..................... 156/62.4 |
| 5,238,733 A | | 8/1993 | Joseph et al. ............... 428/284 |
| 5,308,695 A | | 5/1994 | Arakawa et al. ............ 428/354 |
| 5,326,415 A | * | 7/1994 | Thomas et al. ........ 156/244.11 |
| 5,334,446 A | | 8/1994 | Quantrille et al. .......... 428/284 |
| 5,336,545 A | | 8/1994 | Morman ..................... 428/152 |
| 5,366,793 A | | 11/1994 | Fitts, Jr. et al. ............. 428/198 |
| 5,382,400 A | | 1/1995 | Pike et al. ................... 264/168 |
| 5,382,466 A | | 1/1995 | Ingham ...................... 428/219 |
| 5,385,775 A | * | 1/1995 | Wright ........................ 428/284 |
| 5,393,475 A | | 2/1995 | Murasaki et al. ........... 264/167 |
| 5,393,599 A | | 2/1995 | Quantrille et al. .......... 428/284 |
| 5,413,849 A | | 5/1995 | Austin et al. ................ 428/293 |
| 5,422,172 A | | 6/1995 | Wu ............................. 428/230 |
| 5,431,991 A | | 7/1995 | Quantrille et al. .......... 428/109 |
| 5,456,660 A | * | 10/1995 | Reich et al. .................. 602/79 |
| 5,514,470 A | | 5/1996 | Haffner et al. .............. 428/246 |
| 5,560,878 A | | 10/1996 | Dragoo et al. .............. 264/115 |
| 5,601,851 A | | 2/1997 | Terakawa .................. 425/72.2 |
| 5,616,408 A | | 4/1997 | Oleszczuk et al. .......... 442/346 |
| 5,629,079 A | | 5/1997 | Battles et al. ................. 442/60 |
| 5,647,842 A | | 7/1997 | Kininmonth et al. ......... 602/76 |
| 5,656,167 A | | 8/1997 | Martz ......................... 210/490 |
| 5,679,302 A | * | 10/1997 | Miller et al. ................ 264/167 |
| 5,681,302 A | * | 10/1997 | Melbye et al. .............. 604/373 |
| 5,681,645 A | * | 10/1997 | Strack et al. ................ 428/196 |
| 5,699,593 A | * | 12/1997 | Jackson ........................ 24/445 |
| 5,733,822 A | | 3/1998 | Gessner et al. .............. 442/35 |
| 5,759,926 A | | 6/1998 | Pike et al. ................... 442/333 |
| 5,762,623 A | * | 6/1998 | Murphy et al. ............... 602/75 |
| 5,792,411 A | | 8/1998 | Morris et al. ............... 264/400 |
| 5,843,057 A | | 12/1998 | McCormack ............... 604/367 |
| 5,887,320 A | * | 3/1999 | Provost ....................... 24/452 |
| 5,933,927 A | * | 8/1999 | Miller et al. .................. 24/452 |
| 5,953,797 A | * | 9/1999 | Provost et al. ................ 24/452 |
| 6,076,238 A | * | 6/2000 | Arsenault et al. ............. 24/452 |

FOREIGN PATENT DOCUMENTS

| | | | | |
|---|---|---|---|---|
| DE | 42 02 325 | * | 8/1993 | ............ D03D/1/00 |
| EP | 0 330 716 A2 | | 6/1989 | |
| EP | 0 432 763 A1 | | 6/1991 | |
| GB | 2256785 A | | 12/1992 | |
| JP | 07-124004 | * | 5/1995 | ............ A44B/18/00 |
| WO | WO 90/03464 | | 4/1990 | |
| WO | WO93/15245 | | 8/1993 | |
| WO | WO95/03443 | | 2/1995 | |
| WO | WO 97/01315 | * | 1/1997 | ............ A61F/13/00 |
| WO | WO97/02375 | | 1/1997 | |
| WO | WO97/04154 | | 2/1997 | |
| WO | WO 97/06299 | | 2/1997 | |
| WO | WO 98/02610 | | 1/1998 | |
| WO | WO 98/29251 | | 7/1998 | |
| WO | WO 99/37480 | | 7/1999 | |
| WO | WO 99/44457 | | 9/1999 | |
| WO | WO 00/50229 | * | 8/2000 | ............ B32B/3/10 |

OTHER PUBLICATIONS

"Standard Test Method for Tensile Strength and Elongation of Pressure–Sensitive Tapes", Designation: D 3759–83, pp. 662–671.

"Standard Test Method for Tensile Strength and Elongation of Pressure–Sensitive Tapes", Designation: D 3759–96, pp. 463–468.

"Standard Test Method for Stiffness of Nonwoven Fabrics Using the Cantilever Test", Standard Test: IST 90.1 (95), pp. 77–78.

"Standard Test Method for Stiffness of Nonwoven Fabrics Using the Gurley Tester", Standard Test: IST 90.2, (95), pp. 79–80.

"Standard Test Method for Handle–O–Meter Stiffness of Nonwoven Fabrics", Standard Test: IST 90.3 (95), pp. 81 82.

"Composite Beathable Membranes", Joel Martz, Laivan Corporation, Nonwoven Industry, Apr. 1998, pp. 92 & 93.

"Superfine Thermoplastic Fibers", *Industrial Engineering Chemistry,* Wente, Van A., vol. 48, pp. 1342, et seq.

Report No. 4364 of the Navel Research Laboratories, published May 25, 1954, entitled "Manufacture of Superfine Organic Fibers", Wente Van A., Boone C.D., and Fluharty, E.L.

* cited by examiner

APPARATUS FOR
MAKING COMPOSITE

APPARATUS FOR
MAKING COMPOSITE

APPARATUS FOR
MAKING COMPOSITE

APPARATUS FOR
MAKING COMPOSITE

APPARATUS FOR
MAKING COMPOSITE

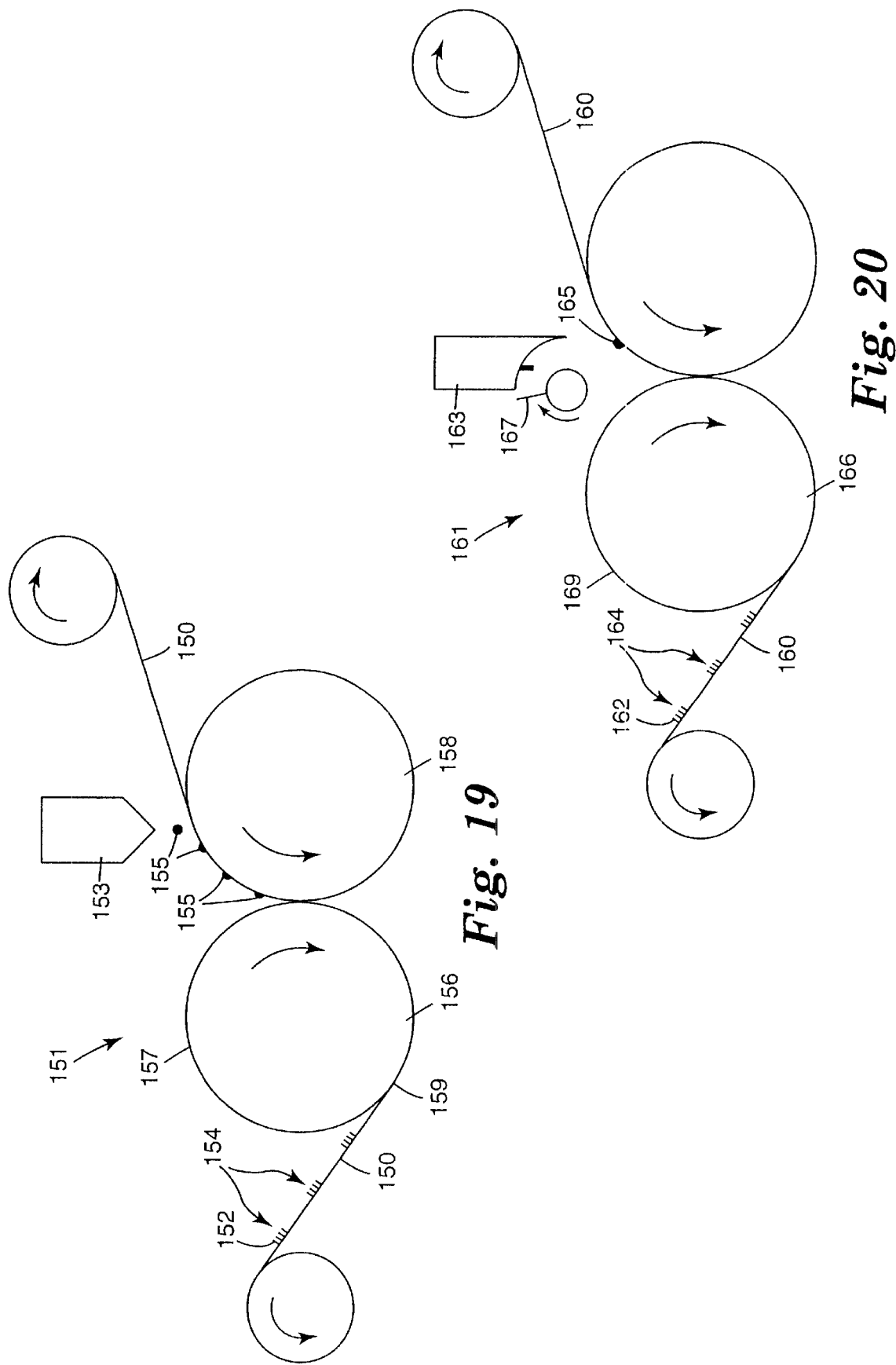

LAMINATED COMPOSITES

RELATED APPLICATIONS

This application is a continuation-in-part of U.S. patent applications Ser. No. 09/165,672, filed Oct. 2, 1998, now abandoned and Ser. No. 09/257,447, filed Feb. 25, 1999. The entire disclosures of the parent applications are incorporated by reference herein.

FIELD OF THE INVENTION

This invention relates to laminated elastic composites that are suitable for use in tapes, wraps and bandages, and to a method of making such laminated elastic composites.

BACKGROUND OF THE INVENTION

Elastic composite materials are widely used in many forms in a large number of medical products such as tapes, wraps, bandages and wound dressings. Elastic medical products offer many advantages over non-elastic products. Elastic materials are highly conformable to body contours and serve a therapeutic purpose by applying necessary, elastically-resilient pressure over an injured or wounded area during the period that the bandage is in place. In addition, due to the elasticity in such products, they are commonly used to gently and safely immobilize wounded limbs, such as sprained ankles, without resorting to more expensive and restrictive casting methods.

Elastic bandages should preferably be absorbent so that blood and wound exudate may be removed from direct contact with a wound while it is being treated. They should also be breathable to allow for the transpiration of water vapor and other gases. In addition, they should be soft to the touch and conformable in that they readily conform to the contours of irregular surfaces such as parts of the body without crinkling, creasing or cracking. They should also be strong and have a high tensile strength. It is also desirable that elastic bandages be inexpensive and that they be made with economical materials and efficient processes.

Although all of these properties are pursued by workers in the field, it is difficult in practice to produce a single elastic composite that possesses them all, because the materials and methods that are ideally suited to provide some of the desired properties may at the same time possess countervailing qualities that prevent the achievement of others. For example, some polymeric films possess the desirable properties of strength and low cost of manufacture, yet these same films have the disadvantage of being neither breathable nor conformable.

Elastic composites are known that incorporate one or more nonwoven fiber webs as components. U.S. Pat. No. 4,984,584 describes a shirred cohesive bandage that includes two nonwoven fiber web outer layers and an inner layer of substantially parallel elastic yarns oriented in the machine direction. The fabric of the bandage is made by advancing a layer of stretched elastic yarns into a double roller apparatus, which simultaneously sandwiches the elastic yarns between two nonwoven carded webs and coats the resulting composite with a binder material. The composite is then passed through a drying oven and collected on a roll.

Elastic composites are also made by combining elastic and nonelastic nonwoven webs. For instance, U.S. Pat. No. 4,863,779 describes an elastic composite comprising an elastic nonwoven fiber web thermally bonded to one or more nonelastic nonwoven fiber webs.

U.S. Pat. No. 5,385,775 describes an elastic composite that includes two outer nonwoven fiber webs and an inner elastic fibrous web. The elastic fibrous web is said to comprise one layer of elastomeric melt blown fibers and one layer of parallel elastomeric filaments. The composite is made by advancing a stretched elastic nonwoven fiber web into the heated nip of a double roller apparatus where it is sandwiched between the nonwoven fiber webs and thermally bonded.

Elastic composites may also be formed by melt blowing fibers onto elastic filaments or pre-made fiber webs. U.S. Pat. No. 5,219,633 (the '633 patent) describes an elastic composite that is formed in-line by extruding elastic filaments into parallel rows and then melt blowing fibers onto the elastic filaments. The two layers are then squeezed between opposing heated rollers to form a nonwoven-elastic composite. The melt blown fibers may be adhesive or pressure-sensitive adhesive fibers. Nonwoven cover webs may also be provided as additional layers in the composite. The '633 patent also discloses a method of making an elastic composite in which fibers are melt blown between two non-woven layers at the nip of a thermally bonding apparatus. The composite also includes a layer of elastic filaments, which may be extruded at the nip as well.

SUMMARY

The invention provides laminated elastic composites that include an elastic layer and a layer of fibers that are melt blown onto the elastic layer in an in-line process. The elastic layer includes a layer of substantially parallel, spaced apart elastic filaments oriented in the machine direction.

In one embodiment of the invention, the laminate composite includes a nonwoven fiber cover web and has a configuration generally represented as nonwoven//elastic//melt blown fiber.

In yet another embodiment, a second nonwoven cover web is provided, and the laminate composite has a configuration generally represented as first nonwoven//elastic//melt blown fiber//second nonwoven.

The invention also provides embodiments in which a scrim layer is included as a layer in the laminate composite.

The invention also provides a method of making elastic laminate composites. The method of the invention is practiced with an apparatus that includes a melt blowing die, a collector drum, a roll upstream from the die for dispensing a continuous length of a first nonwoven fiber web, a roll for dispensing a layer of substantially parallel elastomeric fibers upstream from the die, a roll for dispensing a second nonwoven web downstream from the die, a calender roll that forms a nip with the collector drum for thermally bonding the composite, and a winder roll for collecting the elastic composite after thermal bonding is complete.

To form an elastic composite using this apparatus, the first nonwoven fiber web and the elastic layer are dispensed from the upstream rolls and advanced over the collector drum in such a manner that the elastic filaments are situated between the nonwoven material and the die. These two layers are advanced forward and the melt blowing die deposits a layer of melt blown adhesive fibers on the elastic layer, binding together the elastic filaments to the nonwoven web and to the melt blown layer. The three layers are then advanced toward the nip formed by the collector drum and the squeezing roll. The second nonwoven fiber web is brought into contact with the exposed surface of the melt blown adhesive fibers and the composite is pressure laminated bonded as it advances through the opposing temperature controlled rollers. The elastic layer is stretched substantially beyond its relaxed state before and during lamination of the nonwoven fiber webs and scrim to the elastic layer (e.g., the elastic layer is stretched in the machine direction at least 50 percent beyond its relaxed state, and preferably 50–300%). The composite fabric is then relaxed and collected onto the winder roll.

The elastic composite made by this method comprises a first nonwoven fiber layer, an elastic layer comprising substantially parallel elastomeric filaments, a melt blown fiber adhesive layer and a second nonwoven fiber layer.

Several alternative elastic composites can be made within the method of the invention. The apparatus may be modified to include an upstream roll for dispensing a scrim that comprises spaced-apart filaments oriented in the machine direction that are substantially perpendicular to spaced-apart filaments oriented in the cross direction. Using this modified apparatus, a length of scrim material may be placed between the first nonwoven web and the elastic layer of the elastic composite. The presence of the scrim in this composite provides added tensile strength to the composite and provides the advantage of facilitating tearing in either the machine direction or the cross direction along the lines provided by the filaments.

In another alternative, the nonwoven rolls are eliminated, and the adhesive fibers are melt blown onto the elastic layer to form a composite that comprises an elastic layer comprising substantially parallel elastomeric filaments and melt blown adhesive fibers. This method may be further modified to provide a scrim layer so that the resulting composite comprises a scrim layer, an elastic layer comprising substantially parallel elastomeric filaments and a melt blown adhesive fiber layer.

The nonwoven webs and scrim of the laminated elastomeric composite also form loops useful as part of a hook and loop fastening system, and are well adapted for use with the hook system described, for example, in U.S. patent application Ser. No. 09/257,447, filed Feb. 25, 1999 now abandoned.

DESCRIPTION OF THE DRAWINGS

FIG. 19 is a schematic diagram of an apparatus for use in a first method of making a stemmed web using a dot coater to distribute stem-forming material onto a web.

FIG. 20 is a schematic diagram of an apparatus for use in a second method of making a stemmed web using a knife cutter to distribute stem-forming material onto a web.

DETAILED DESCRIPTION OF THE INVENTION

Figure 1:
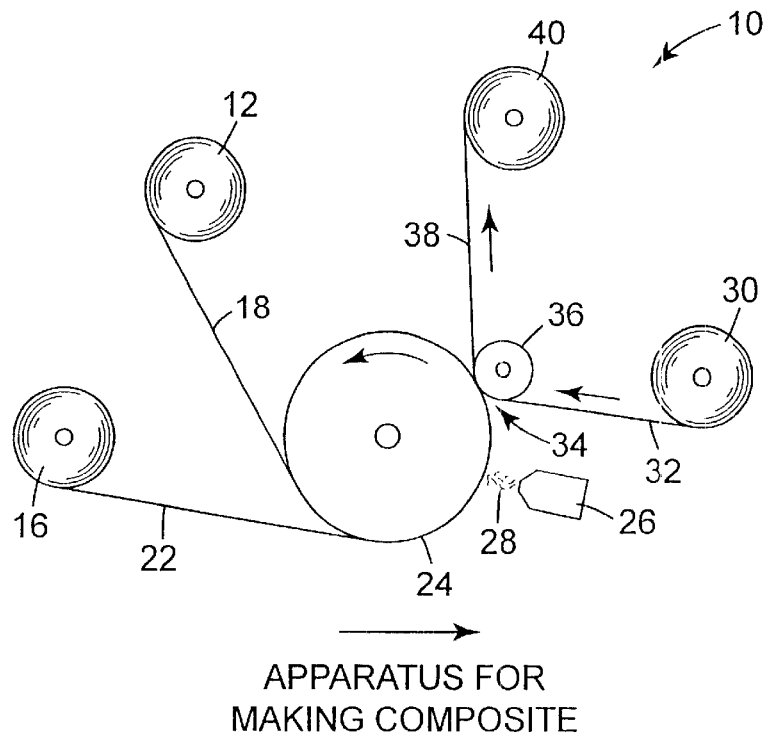
FIG. 1 is a schematic view of an apparatus for making an embodiment of the elastic composite of the invention.

The elastic composites of the invention include a layer of substantially parallel elastomeric filaments onto which adhesive fibers have been melt blown in a single in-line method. Additional layers may be added to the composite. For instance, composites may be prepared according to the method that also include one or more nonwoven cover webs, an optional scrim layer or an outer adhesive layer.

The elastic composites of the invention are breathable, soft, strong and economical. Because of their unique combination of properties, they are suited for use in many products including medical products and consumer products. Medical products that may be improved or enhanced by incorporating the elastic composites of the invention include adhesive tapes, cohesive tapes, bandages and dressings, wraps and surgical drapes, including incise drapes which are adhered to the skin surrounding a surgical incision. Appropriate consumer applications for the elastic composites disclosed herein include diaper tapes, diaper side panels and elastic utility tapes.

The method of making elastic composites of the invention, and the elastic composites of the invention, are explained with reference to the drawings wherein like reference numerals refer to the same or equivalent structures.

FIG. 1 is a schematic diagram illustrating the preferred apparatus and method for making elastic composites of the invention. The apparatus 10 of the method includes a die 26 for melt blowing thermoplastic fibers 28 onto collector drum 24. Nonwoven dispensing roll 12 is located upstream from the die 26 and dispenses a length of nonwoven fiber web material 18 from a continuous length roll. The nonwoven web 18 is advanced over the collector drum 24, under the die 26, through the nip 34 formed by the collector drum and the squeezing roll 36, and is collected on winder roll 40.

Elastic layer dispensing roll 16 is also located upstream from the die and dispenses a length of an elastic layer 22 from a continuous length roll over nonwoven web 18 and collector drum 24. Elastic layer 22 includes a series of spaced-apart, substantially parallel elastomeric filaments. Elastic layer 22 is stretched as it is dispensed by unwinding the elastic layer 22 at a rate that is slower than the unwind rate of the nonwoven roll 12 and the rate of rotation of collector drum 24. The stretched elastic layer 22 is advanced over the nonwoven web 18 along the same path as the nonwoven material 18 and passes under the die 26 between the nonwoven web 18 and the die 26. The elastic layer 22 is collected on winder roll 40.

Collector drum 24 rotates so as to advance the nonwoven web 18 and elastic layer 22 from the dispensing rolls 12, 16 toward the winder roll 40. As the two layers 18, 22 pass under the die, adhesive fibers 28 are melt blown onto the elastic layer 22 at high temperature. The adhesive fibers form a thermal bond with the elastomeric filaments 22 and underlying nonwoven web 18 and provide additional structural integrity due to their filamentous composition. The three layer intermediate structure is then advanced toward nip 34 formed by collector drum 24 and a calender roll 36. A second nonwoven web 32 is then dispensed from non-woven dispensing roll 30 downstream from the die and advanced toward the nip 34 where it is placed in contact with the melt blown adhesive layer 28 forming a fourth layer 32.

Figure 6:
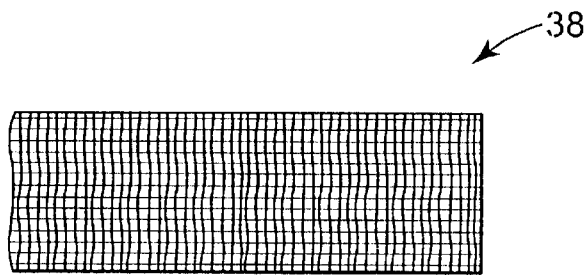
FIG. 6 is a top view of an embodiment of the elastic composite of the invention.
Figure 7:
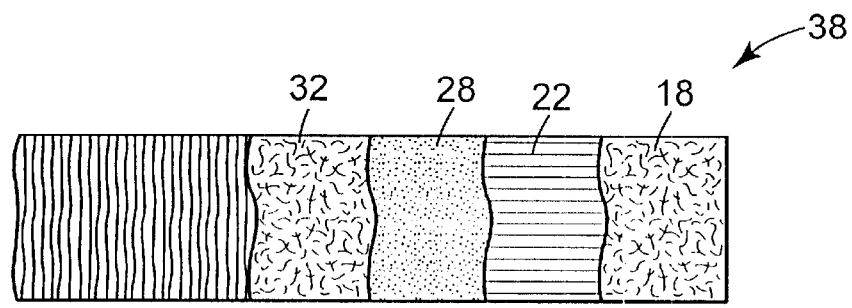
FIG. 7 is an exploded top view of the elastic composite of the invention shown in FIG. 6, showing the individual layers of the composite.
Figure 8:
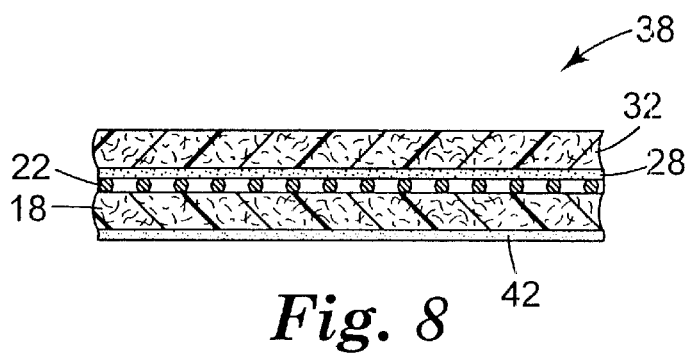
FIG. 8 is a cross sectional view of an embodiment of the elastic composite of the invention.

The elastic composite 38 is then pressure laminated by passing it through nip 34. The tension in the composite 38 is then relaxed, and the composite assumes a shirred appearance. The composite 38 is then collected on winder roll 40. Elastic composite 38 is shown in FIGS. 6–8 and includes in the following order nonwoven layer 32, melt blown adhesive layer 28, elastic layer 22, and nonwoven layer 18.

The term nonwoven web as used herein means a web of material that has been formed without the use of a weaving process. Fibers in a nonwoven web are typically laid down or deposited in a mat and are associated with each other in a random pattern. Nonwoven webs may be formed of thermoplastic fibers using several processes known in the art including melt blowing processes, spun-bonding processes, spun-lacing processes, needle punched web making processes, air laid web making processes, wet laid web making processes, film aperturing processes, and staple fiber carding processes. Nonwoven webs made by any of these processes are suitable for use as nonwoven webs 18,32 in the method of forming the elastic composite of the invention. Nonwoven webs 18, 32 are preferably pre-made nonwoven webs, which are available from a number of commercial sources. In a more preferred embodiment of the invention, nonwoven webs 18, 32 are spun-bond nonwoven webs made with thermoplastic polymers, such as the polypropylene spunbond nonwoven material available as product No. 4001720 from Avgol Nonwoven Industries, Holon, Israel. The nonwoven webs may be made of any thermoplastic polymer including, for example, polypropylene, polyester and nylon.

Nonwoven web 18, may be made of the same material as nonwoven web 32, or alternatively the webs 18, 32 may be made of different materials. In addition, nonwoven web 18 may be made by the same process as nonwoven web 32 or by an entirely different process.

The elastic layer 22 may comprise substantially parallel, substantially spaced-apart elastomeric filaments of any suitable elastomeric material characterized by the ability to stretch from its original length upon application of a force and yet substantially recover to its original length upon release of the force. The elastomeric filaments in the layer 22 are oriented with their length in the machine direction. The term machine direction, as used herein, refers to the direction of movement of the individual components of the elastic composite 38 as they are transported during the in-line method of the invention. The term cross direction, as used herein, refers to a direction perpendicular to the machine direction. The elastomeric filaments are preferably laid across the nonwoven web 18 in the machine direction with a spacing of between about 1–30 filaments/cm in the cross direction, more preferably with a spacing of between about 1–20 filaments/cm in the cross direction, and most preferably with a spacing of between about 1–10 filaments/cm in the cross direction. Preferably, the elastic filaments have a denier in the range of about 80–800 denier, and more preferably in the range of about 200–500 denier.

Elastomeric filaments used in the elastic layer 22 may preferably be made of natural rubber, synthetic rubber or thermoplastic polymers. Suitable synthetic rubbers include ether-based polyurethane Spandex, ester-based polyurethane Spandex, SBR styrene butadiene rubber, EPDM ethylene propylene rubber, fluororubbers, silicone rubber and NBR nitrile rubber. Suitable thermoplastic elastomers for use as elastomeric filaments include block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. The block copolymers may be, for example, (polystyrene/poly(ethylene-butylene)/polystyrene) block copolymers available from the Shell Chemical Company under the name KRATON®. Other suitable elastomeric materials include polyurethane elastomeric materials, polyamide elastomeric materials, and polyester elastomeric materials.

In the most preferred embodiment of the invention, polyurethane elastic filaments such as those available under the name GLOSPAN™ from Globe Manufacturing Company, Gastonia, N.C., are used to form the elastic layer 22.

The melt blown adhesive fibers 28 deposited from die 26 onto the elastic layer 22 are preferably melt blown pressure-sensitive adhesive fibers made according to the method discussed in Wente, Van A., "Superfine Thermoplastic Fibers," in *Industrial Engineering Chemistry*, Vol. 48, pages 1342 et seq. (1956) or in Report No. 4364 of the Naval Research Laboratories, published May 25, 1954, entitled "Manufacture of Superfine Organic Fibers" by Wente, Van A., Boone, C. D., and Fluharty, E. L, and in U.S. Pat. Nos. 3,849,241 and 3,825,379, and in commonly assigned U.S. application Ser. No.08/980,541 now U.S. Pat. No. 6,171, 985, which is incorporated herein by reference.

The melt blown pressure-sensitive adhesive fibers 28 may comprise a single layer of pressure-sensitive adhesive component. Alternatively, the pressure-sensitive adhesive fibers may comprise non-pressure-sensitive adhesive fibrous material intimately commingled with the pressure-sensitive adhesive fibers. The commingled pressure-sensitive adhesive fibers or fibers and non-pressure-sensitive adhesive fibrous material may be present in separate individual fibers, or the pressure-sensitive adhesive fibers or fibers and the non-pressure-sensitive adhesive material may form distinct regions in a conjugate fiber and/or be part of a blend. For example, conjugate fibers can be in the form of two or more layered fibers, sheath-core fiber arrangements or in an "island in the sea" type fiber structure. In this case, one component layer would comprise the pressure-sensitive adhesive fiber or fiber and a second component layer would comprise the non-pressure-sensitive adhesive fibrous material. Generally, with any form of multicomponent conjugate fibers, the pressure-sensitive adhesive fiber component will provide at least a portion of the exposed outer surface of the multicomponent conjugate fiber. Preferably, the individual components of the multicomponent conjugate fibers will be present substantially continuously along the fiber length in discrete zones, which preferably extend along the entire length of the fibers. The individual fibers generally are of a fiber diameter of less than 100 microns, preferably less than 50 microns or 25 microns for fibers.

Conjugate melt blown fibers can be formed, for example, as a multilayer fiber as described, for example, in U.S. Pat. Nos. 5,238,733; 5,601,851; or PCT Publication No. WO 97/2375. Multilayered and sheath-core melt blown fibers are described, for example, in U.S. Pat. No. 5,238,733, the substance of which is incorporate herein by reference in its entirety. This patent describes providing a multicomponent melt blown fiber web by feeding two separate flow streams of polymer material into a separate splitter or combining manifold. The split or separated flow streams are generally combined immediately prior to the die or die orifice. The separate flow streams are preferably established into melt streams along closely parallel flow paths and combined where they are substantially parallel to each other and the flow path of the resultant combined multilayered flow stream. This multilayered flow stream is then fed into the die and/or die orifices and through the die orifices. Air slots are disposed on either side of a row of die orifices directing uniform heated air at high velocities at the extruded multicomponent melt streams. The hot high velocity air draws and attenuates the extruded polymeric material, which solidifies after traveling a relatively short distance from the die. The high velocity air becomes turbulent between the die and the collector surface causing the melt blown fibers entrained in the air stream to mutually entangle and form a coherent web. The either solidified or partially solidified fibers are then collected on a surface by known methods. Also, other fibers and/or particulates can be fed into this turbulent airstream thereby getting incorporated into the forming coherent nonwoven web. This can be done, for example, by using a macrodropper, a second fiber forming die or other known methods.

Alternatively, conjugate fibers can be formed by a spunbond process such as the process described in U.S. Pat. No. 5,382,400 where separate polymer flow streams are fed via separate conduits to a spinneret for producing conjugate fibers of a conventional design. Generally, these spinnerets include a housing containing a spin pack with a stack of plates that form a pattern of openings arranged to create flow paths for directing the separate polymer components separately through the spinneret. The spinneret can be arranged to extrude the polymer vertically or horizontally in one or more rows of polymers.

Suitable polymers for use in forming the melt blown pressure-sensitive adhesive fibers 28 include any thermoplastic pressure-sensitive adhesive polymer that is suitable for melt blowing processes, including those described in U.S. application Ser. No. 08/980541 now U.S. Pat. No. 6,171,985.

In a preferred embodiment of the invention, the melt blown pressure-sensitive adhesive fibers 28 have a multilayer composition comprising one layer of a non-pressure-sensitive adhesive and one or more layers of a pressure-sensitive adhesive. In a more preferred embodiment, the melt blown pressure-sensitive adhesive fibers have a three layer construction comprising two outer layers of a pressure-sensitive adhesive and one layer of a non-pressure-sensitive adhesive. These melt blown fibers are prepared using an apparatus similar to that described in U.S. Pat. Nos. 3,480,502 and 3,487,505. The gear pumps feed a three-layer feedblock (splitter) assembly connected to a melt blowing die having circular, smooth orifices. The primary air is maintained at 240° C. and 241 KPa, and both the die and feedblock assembly are maintained at 240° C. The feedblock assembly is fed by two polymer melt streams, one being a melt stream of pressure-sensitive adhesive, for example, HL-1487 block copolymer PSA available from HB Fuller Company, St. Paul, Minn., at 190° C., and the other being a melt stream of non-pressure-sensitive adhesive melt stream, for example, EXACT™ 4023 ultra low density polyethylene resin available from Exxon Chemicals, Bayton, Tex., at 230° C. The gear pumps are adjusted to produce a 1.6 to 1.0 ratio of pressure-sensitive adhesive to non-pressure-sensitive adhesive, and the blown fiber pressure-sensitive adhesive is directed to the elastic fiber layer 22 on the collector drum. The feedblock assembly splits the melt streams and combines them in an alternating manner into a three-layer melt stream exiting the feedblock assembly, the outermost layers of the exiting stream being the pressure-sensitive adhesive.

In an alternative preferred embodiment, the melt blown pressure-sensitive adhesive fibers 28 are single layer fibers prepared by processing a pressure-sensitive adhesive through a grid melt system such as that available from J&M Laboratories, Inc., Dawsonville, Ga., and then melt blown through a blown fiber die directed at the elastic layer 22.

In a preferred embodiment of the invention the elastic composite 38 is cohesive. As used herein, the term cohesive means that a fabric has a self-adhesive property so that two or more layers when placed in contact with each other will tend to stick together. This property is particularly desirable where the cohesive, elastic composition 38 is used in medical bandages or wraps, because overlapping layers of a cohesive bandage will stick together and hold the layers of the bandage in place relative to each other, but will not stick appreciably to skin or other surfaces.

A cohesive bandage may be made according to the method of the invention by adjusting the ratio of pressure-sensitive adhesive to non-pressure-sensitive adhesive in the melt blown fiber pressure-sensitive adhesives. The cohesion of the bandage may be increased by increasing the percentage of pressure-sensitive adhesive in the melt blown fibers or by increasing the percentage of adhesive fibers in the elastic composite. Preferably, the melt blown pressure-sensitive adhesive fibers used in cohesive composites include no non-adhesive components. The increased tack of these fibers is transferred through the nonwoven surface webs 18, 32 and thus gives the elastic composite 38 a cohesive property. A single component fiber of pressure-sensitive fiber may be made using the processes of Wente, referenced above.

As used herein, the terms "fibrous adhesive" and "fibrous pressure sensitive adhesive" include melt blown fiber adhesives or pressure sensitive adhesives as well as any other fibrous adhesive.

As shown in FIG. 8, the elastic composition 38 may optionally be coated on one of its outer surfaces with a layer of pressure-sensitive adhesive 42 for use as an adhesive tape. Where an adhesive layer is applied to one of the nonwoven cover webs 18, 32, a low adhesion backside (LAB) coating is preferably applied to the other nonwoven cover web. The LAB reduces adhesion between the adhesive and non-adhesive coated webs when the composite 38 is wound upon itself in a storage roll and thus aids in dispensing the product.

Several LAB's are known in the art can achieving this purpose. For example, a suitable LAB includes a polyurethane release agent consisting of the reaction product of a 50/50 mixture of octadecyl isocyanate and a 50% hydrolyzed polyvinyl acetate.

Figure 2:
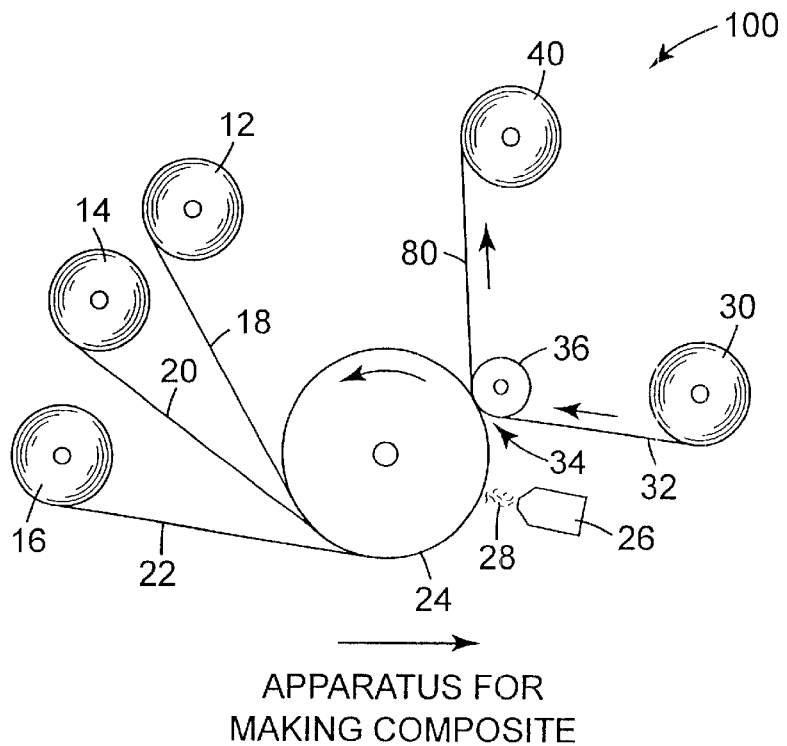
FIG. 2 is a schematic view of an apparatus for making an embodiment of the elastic composite of the invention.
Figure 13:
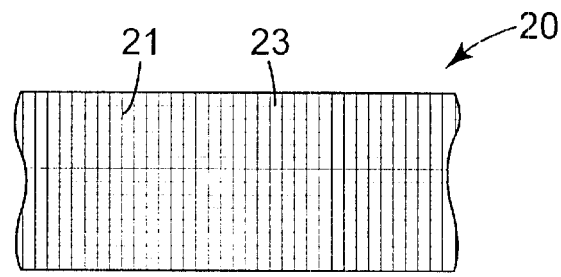
FIG. 13 is a top view of the weft-inserted scrim layer used in an embodiment of the elastic composite of the invention.

Several variations of the method of the invention are possible without deviating from the general scope of the invention. FIG. 2 shows a schematic diagram of an alternative embodiment of the method of the invention that utilizes apparatus 100 to make an elastic composite that includes a scrim layer 20. The scrim 20, which is best shown in FIG. 13, includes spaced-apart filaments 23 oriented in the machine direction that are substantially perpendicular to spaced-apart filaments 21 oriented in the cross direction. The scrim layer 20 enhances the tensile strength of the composite and facilitates hand tearing of the elastic composite in both the machine direction and the cross direction by providing tear lines along the interwoven threads. In addition, the scrim provides a deadstop, or stretch limit, which prevents over stretching of the composite. The scrim may be made of natural wovens, synthetic wovens, nonwovens, knits (including without limitation weft insertion knits) or plastics. There should be sufficient yarns in the scrim to provide regular tear lines without interfering with the elastic or other properties of the composite. The scrim may be preferably woven, knitted or extruded. Preferably, the scrim includes between about 5 and 30 threads per inch in the machine direction and between about 5 and 30 threads per inch in the cross direction.

The strands or filaments of the scrim should be spaced such that the strands enhance the finger-tearability of the composite 38 without interfering with its porosity, breathability or flexibility. The thread count of the scrim is, preferably, between 1 and 50 yarns per inch in the machine direction and between 1 and 50 yarns per inch in the cross direction, more preferably, between 1 and 30 yarns per inch in the machine direction and between 1 and 30 yarns per inch in the cross direction, and most preferably, between about 5 and 30 yarns per inch in the machine direction and between about 5 and 30 yarns per inch in the cross direction. Examples of suitable scrims include weft-inserted polyester scrims, such as those that are available from Milliken & Company, Spartanburg, N.C., as Product No. 924864, 18 machine direction yarns/2.5-cm (40 denier)×9 cross direction yarns/2.5-cm (150 denier), and Product No. 924916, 18 yarns machine direction yarns/2.5-cm (70 denier)×17 cross direction yarns/2.5-cm (150 denier).

Figure 12:
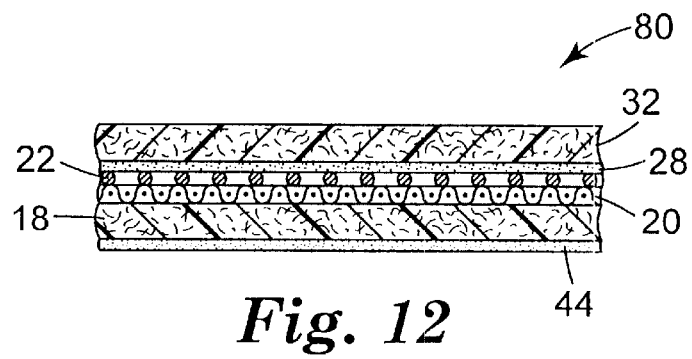
FIG. 12 is a cross sectional view of an embodiment of the elastic composite of the invention.

The scrim material 20 is provided on a continuous length roll 14 on the upstream side of the melt blowing die 26. In the alternative method, a length of the scrim 20 is advanced over the collector drum as an additional layer sandwiched between the first nonwoven layer 18 and the stretched elastic layer 22. Adhesive fibers 28 are melt blown onto the elastic filaments. The four layers are then advanced to the nip 34 where the melt blown adhesive 28 is covered with the second nonwoven web 32 and the resulting composite 80 is pressure laminated and collected on the winder roll 40. As best seen in FIG. 12, composite material 80 includes a first nonwoven layer 18, a scrim layer 20, an elastic layer 22, a melt blown pressure-sensitive adhesive layer 28, and a second nonwoven layer 32. The composite is elastic. The composite may optionally be provided with a pressure-sensitive adhesive 44 on one side to form a tape. If a pressure-sensitive adhesive layer 44 is used it is preferable to coat the opposite side with an LAB coating, as described above.

Figure 3:
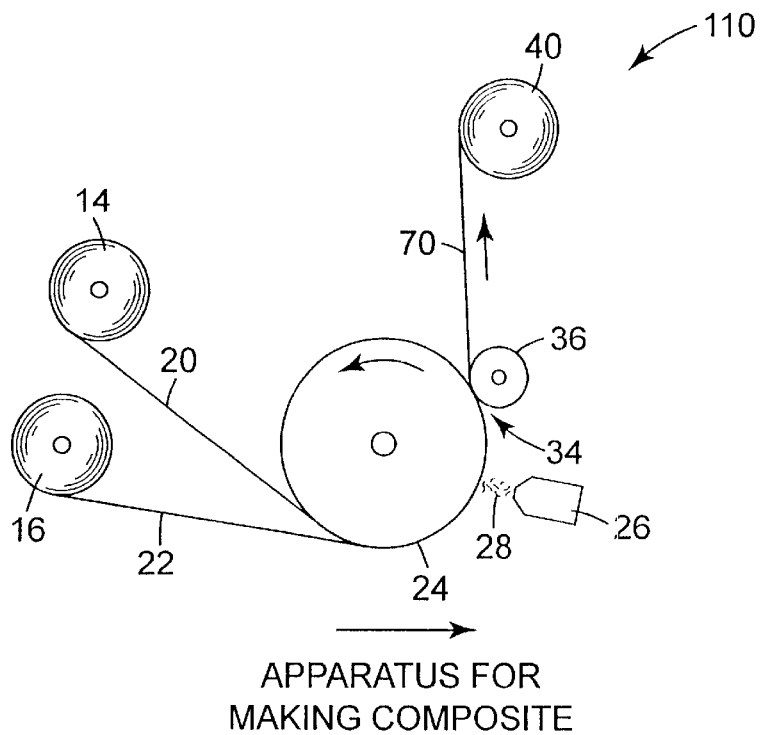
FIG. 3 is a schematic view of an apparatus for making an embodiment of the elastic composite of the invention.
Figure 11:
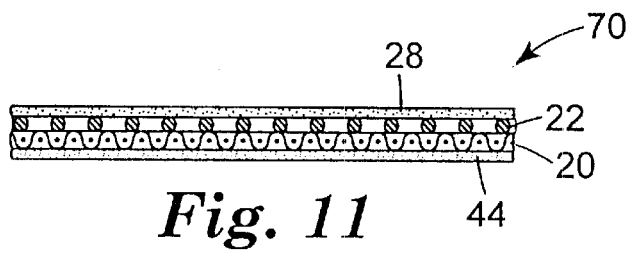
FIG. 11 is a cross sectional view of an embodiment of the elastic composite of the invention.

In another embodiment of the method of the invention, shown in the schematic diagram in FIG. 3, the apparatus 110 may be used to make an elastic composite 70, shown in FIG. 11, comprising a scrim layer 20, an elastic layer 22 and a melt blown pressure-sensitive adhesive layer 28. In this embodiment the scrim layer 20 and the stretched elastic layer 22 are advanced over the collector drum with the elastic layer 22 on top, and melt blowing die 26 deposits melt blown pressure-sensitive adhesive fibers onto the elastic layer 22. The term "stretched" in this context means stretched substantially beyond the relaxed state before and during lamination of the nonwoven fiber webs and scrim to the elastic layer (e.g., the elastic layer is stretched in the machine direction at least 50 percent beyond its relaxed state, and preferably 50–300%), and thus means stretched more than insubstantial stretching of the type that might be employed to maintain tension on the elastic layer merely for material handling purposes. The composite 70 is then advanced through the nip 34 and collected on winder roll 40. The resulting tape is both elastic and easily torn in both the machine direction and the cross direction. This embodiment may be made cohesive, as well, according to the methods described above.

Figure 4:
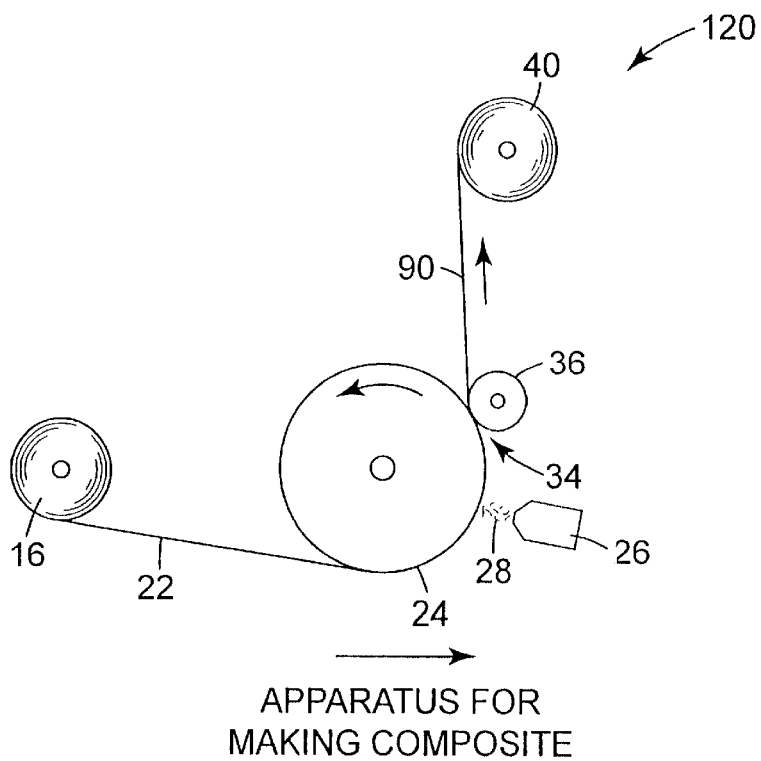
FIG. 4 is a schematic view of an apparatus for making an embodiment of the elastic composite of the invention.
Figure 14:
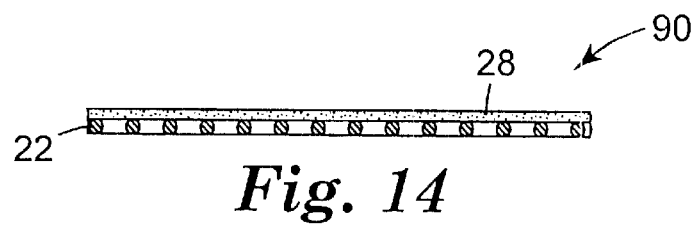
FIG. 14 is a cross sectional view of an embodiment of the elastic composite of the invention.

In yet another embodiment of the method of the invention shown in the schematic diagram in FIG. 4, the apparatus 120 may be used to make an elastic composite 90 shown in FIG. 14 comprising an elastic layer 22 and a melt blown pressure-sensitive adhesive layer 28. The stretched elastic layer 22 is advanced over the collector drum 24, and the die 26 deposits melt blown fibers directly onto its surface. The composite 90 is run through nip 34 and collected onto the winder roll 40. Composite 90 may be made in a cohesive form.

Figure 5:
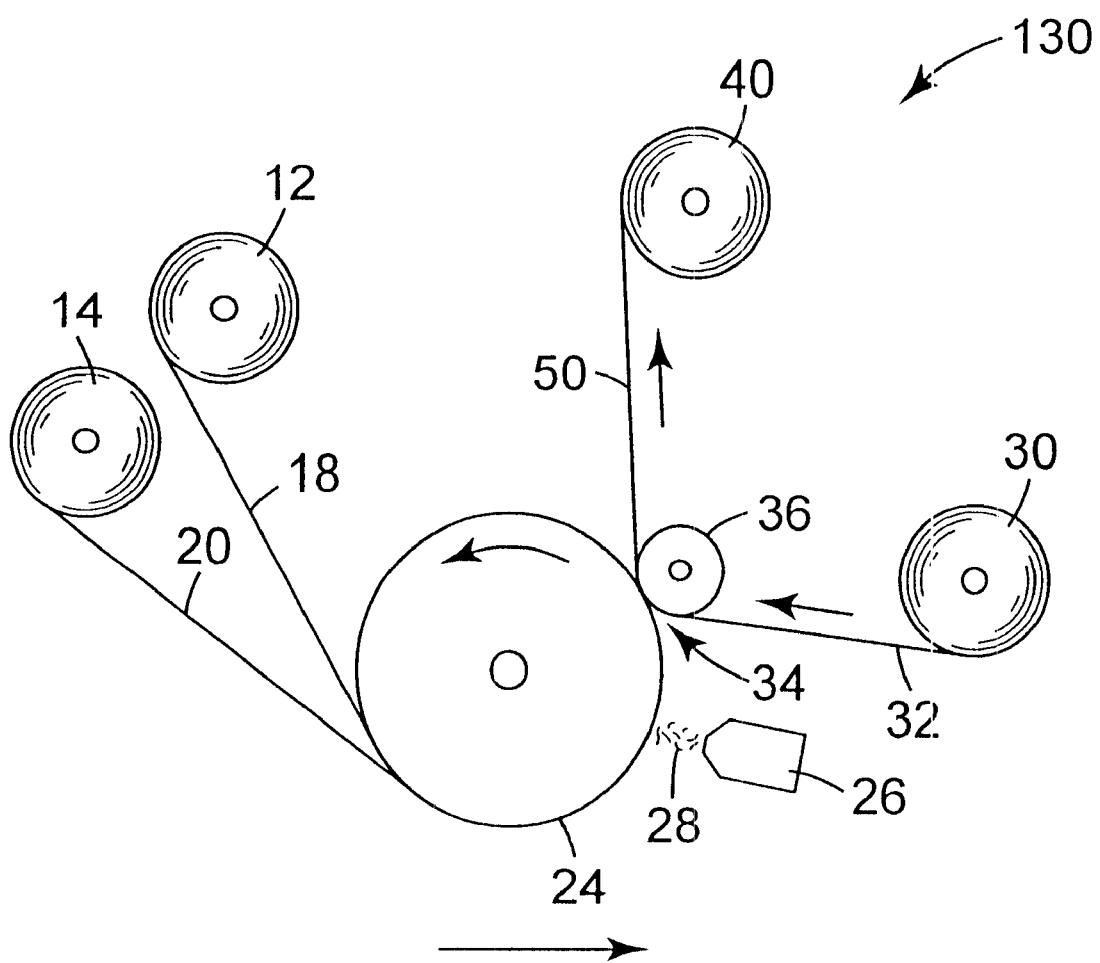
FIG. 5 is a schematic view of an apparatus for making an embodiment of the composite of the invention.
Figure 9:
FIG. 9 is a cross sectional view of an embodiment of the laminated composite of the invention.

In addition to making elastic composite materials, the method of the invention is also suitable for making nonelastic composite materials as well. The schematic diagram in FIG. 5, the apparatus 130 illustrates a method of making a nonelastic composite material 50 suitable for use in adhesive tapes. The composite 50 shown in FIG. 9, includes a first nonwoven layer 18, a scrim layer 20, a melt blown pressure-sensitive adhesive layer 28 and a second nonwoven layer 32. The first nonwoven web 18 and the scrim layer 20 are advanced over the collector drum and under the die 26 with the scrim layer 20 on top, and the die 26 deposits melt blown pressure-sensitive adhesive fibers on the scrim layer. The three layers are then advanced toward the nip 34 by the rotating collector drum where they are covered by the second nonwoven web 32 and pressure laminated. The nonelastic composite 50 is then collected on winder roll 40. The composite 50 may preferably be coated on one of its sides with a pressure-sensitive adhesive 52 for use as a tape. If a pressure-sensitive adhesive is coated on one side of the tape, it is preferred that an LAB coating be applied to the other side.

Figure 10:
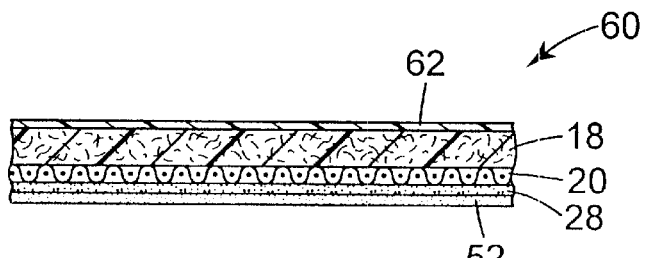
FIG. 10 is a cross sectional view of an embodiment of the laminated composite of the invention.

The method of the invention may also be used to make the composite 60, shown in FIG. 10, which comprises a first nonwoven web 18, a scrim layer 20, and a melt blown pressure-sensitive adhesive layer 28. Composite 60 may optionally include an LAB layer 62. The composite 60 may be made as a non-elastic composite or an elastic composite without the use of elastic filaments. An elastic property may be imparted on the composite after lamination by heating the composite 60 with a hot air dryer, which causes the scrim filaments to shrink giving them an elastic property. Preferably, these elasticized filaments comprise heat-shrinkable texturized yarns.

In some preferred embodiments of the invention, one or more component layers (e.g., the scrim or nonwoven fiber webs) of the composite preferably form suitable loops for engaging hooks of hook and loop fastening systems, such as conventional hooks, polymeric stemmed hooks, mushroom-shaped hooks, and/or fused stems arranged in discrete regions as disclosed in U.S. patent application Ser. No. 09/257,447, filed Feb. 25, 1999, now abandoned, which is incorporated herein by reference. The composite provides such loops while maintaining sufficient integrity between the layers of the composite to satisfactorily handle the mechanical stresses applied by such hooks.

The plurality of the fused stems disclosed in U.S. patent application Ser. No. 09/257,447 now abandoned, extend from each of a plurality of discrete regions. The plurality of stems are preferably fused and formed to at least one major side of the composite, either by fusing on the laminated composite after formation, or fusing on one of the nonwoven fiber webs before forming the composite. The stems are configured for use as a mechanical fastener, and may have one or more different configurations and orientations. For example, the stems may have a hook formation suitable for interlocking with another hook or with a loop. Alternatively, the stems may be substantially mushroom-shaped. The stems may be oriented perpendicular to the composite, or may be oriented at an angle of less than 90 degrees to the composite. In one embodiment, the composite defines a localized plane, and the plurality of stems are oriented at multiple angles to the localized plane. At such angles, the stems provide an improved mechanical fastening effect when a force is applied parallel to the localized plane and against the angled stems. In certain embodiments, at least a portion of the composite is configured and arranged to engage the plurality of stems.

The plurality of stems can be formed of any polymer or mixture of polymers that can flow into the cavities in a stem forming tool and quench or solidify before the composite is pulled away from the tool. Useful polymers are typically thermoplastic materials, including polyurethane, polyolefins (e.g., polypropylene and polyethylene), polystyrenes, polycarbonates, polyesters, polymethacrylate, ethylene vinyl acetate copolymers, ethylene vinyl alcohol copolymers, polyvinylchloride, acrylate modified ethylene vinyl acetate polymers, and ethylene acrylic acid copolymers.

A method of making a composite having a plurality of stems extending from discrete regions or patches on the composite includes providing the composite or a nonwoven fiber web to be formed into one of the surface layers of the composite, and discrete quantities of a polymeric material in a softened state. The discrete quantities of polymeric material are fused to the composite; and a plurality of stems are formed in each discrete fused quantity of polymeric material. The discrete quantities or patches of polymeric material may be fused to the composite or web at substantially the same time that the stems are formed. The discrete quantities of polymeric material may be provided by extruding intermittent quantities of molten polymer onto the web in forms ranging from dots to cross-web stripes. Alternatively, the discrete quantities of polymeric material may be provided by one or more rotating cutting blades.

Alternatively, the discrete regions of stems may be applied in the form of continuous stripes or ribbons. For example, the discrete regions may be arranged in continuous stripes that extend in a down-web direction in straight or zigzag patterns. In between the stripes are parts of the composite surface without stems.

A stem-forming tool has a surface with a plurality of stem-forming holes or cavities arranged in discrete regions. Part of the total surface area of the tool has such holes arranged in discrete regions while there are parts of the surface, in between regions occupied by holes, that are smooth. Alternatively, if the total surface is occupied by holes, a portion of the stem-forming cavities is masked. The composite, bearing a quantity of polymeric material in excess of the amount that would fill the cavities, is pressed against the tool surface under pressure to form regions or patches of stems on the surface of the composite. Each patch is bonded to the composite.

U.S. Pat. Nos. 4,056,593, 4,959,265; 5,077,870 and 5,393,475 disclose additional methods of forming polymeric stemmed webs, and are also incorporated herein by reference.

EXAMPLES

The following examples are offered to aid in understanding of the present invention and are not to be construed as limiting the scope thereof. Unless otherwise indicated, all parts and percentages are by weight.

Test Protocols

Tensile Strength: ASTM Test Method No. D3759-83 was performed using a Thwing Albert tester (Model EJA/2000, Thwing Albert Company, Philadelphia, Pa.), a sample width of 2.54 cm, a gauge length of 5.08 cm, and a crosshead speed of 25.4 cm/min. Reported is the maximum force applied to the test sample to obtain the tensile value at point of break.

Elongation at Break: ASTM Test Method No. D3759-83 was performed using a Thwing Albert tester (Model EJA/2000, Thwing Albert Company, Philadelphia, Pa.), a sample width of 2.54 cm, a gauge length of 5.08 cm, and a crosshead speed of 25.4 cm/min. Reported is the maximum percent of stretch reached by the test sample at point of break.

Web Porosity: The porosity of 5.08-cm×5.08-cm square samples was determined by measuring the time required for a known volume of air under constant pressure to pass through a known area of sample. Using a Gurley Densometer (Model 4110, Gurley Precision Instruments, Troy, N.Y.), a sample was inserted into the orifice plates and clamped. The spring catch was disengaged lowering the inner cylinder to settle under its own weight. The time for the top of the edge of the cylinder to reach the zero line was recorded. If the cylinder did not move after 5 minutes, a value of 301 seconds was recorded. The smaller the time interval, the greater the porosity of the sample. The average results of three samples were reported.

Percent Stretch: The percent stretch of 20-cm in length× 5.08-cm in width samples was determined under a 1000-g load. A sample was laid on a flat surface and labeled with a "mark" across the sample at 12.70 cm in the relaxed state using a permanent marker. The ends of the sample were folded up. Using an apparatus with a vertical arm having a graduated scale and a fixed horizontal arm having a clamp, the top end of the sample was attached to the clamp with the jaws of the clamp perpendicular to the edge of the sample. A bottom clamp was attached to the other end of the sample and allowed to swing freely. A 1000-g weight was attached using a small hook to the bottom clamp. After the stretched sample had stabilized, the amount of stretch was measured with the graduated scale and rounded to the nearest 5%. Three separate measurements were taken and the average of these values reported.

Coverweb Bond: The coverweb bond of 20-cm in length× 5.08-cm in width samples was determined by measuring the distance the elastic strands of a sample retracted from a cut edge of the sample while in the stretched state. A sample was laid on a flat surface and labeled with a "mark" across the sample at 12.70 cm in the relaxed state using a permanent marker. The ends of the sample were folded up. Using an apparatus with a vertical arm having a graduated scale and a fixed horizontal arm having a clamp, the top end of the sample was attached to the clamp with the jaws of the clamp perpendicular to the edge of the sample. A bottom clamp was attached to the other end of the sample and allowed to swing freely. A 1 000-g weight was attached using a small hook to the bottom clamp. After the stretched sample had stabilized, a sharp razor blade was used to make a cut of approximately 2.54-cm in the cross direction of the center of the sample. Using a ruler, the amount of retraction of the elastic strands from the cut was measured to the nearest 1 mm. Three separate sample measurements were taken and the maximum distance the elastic strands retracted from the cut edge was reported.

Cohesive Strength: The cohesive strength of 15.24-cm in length×5.08-cm in width samples was determined according to the following procedure. An Instron tensile tester was modified by using a flange with an attached hook in the upper jaw and a T-shaped aluminum block 3.18-cm in height with a 2.54-cm×2.54-cm facing, and with a 0.8-cm wide hole drilled through the center for attaching the sample. The face of the T-shaped block was covered with SCOTCH™ No. 9589 double-coated adhesive tape (Minnesota Mining and Manufacturing Company, St. Paul, Minn.) so that the tape extended 0.5 cm beyond the edge of the block. The block was then placed adhesive side down onto the sample. Any sample material outside of the 2.54-cm×2.54-cm block facing was removed with a scissors. Using the same T-block, another 2.54-cm×2.54-cm sample was placed against the previous sample. This procedure was repeated until four layers of the sample had been attached to the T-block. The face of a second T-shaped aluminum block of the same dimensions as the first T-block was placed on top of the 4-layered sample keeping the edges of the two blocks and samples aligned. The resulting T-block set-up was then placed in a jig and compressed with a 9.067-kg weight for 60 seconds. The weight was removed and the T-block set-up was hooked to the upper jaw of the Instron using the hole in the first T-block. The lower T-block was placed directly into the lower jaw of the Instron. Using a 5.08-cm/min crosshead speed, the jaws were separated and the force required to pull the layers apart was recorded. Three samples were measured and the average of the three was reported as the cohesive strength in $g/cm^2$.

Hand Tearability: A test sample 2.5-cm wide×7.5-cm long was grasped between the index finger and the thumb of both hands and torn in the cross direction of the sample. The tear line was examined for fraying and/or delamination of the composite. The amount of force required to initiate the tear was also considered. If minimal fraying and no delamination were observed in the sample, the sample demonstrated acceptable tear properties. If delamination, fraying, or large forces were necessary to initiate and propagate the tear, the sample had unacceptable or poor tear properties. For cross direction tears, the tear was rated as follows and was reported as an average of three replications:

1. Very poor tear with excessive fraying and delamination.
2. Poor tear with a large amount of fraying and delamination.
3. Average tear with some fraying and little delamination.
4. Good tear with minimal fraying and no delamination.
5. Excellent tear with no fraying and no delamination.

Example 1

Porous Elastic Wrap (Nonwoven//BMF-PSA//Filaments//Nonwoven Laminate)

A porous elastic wrap comprising a laminate having nonwoven polypropylene outer layers, elastic filaments, and a melt blown adhesive was prepared according to the following process.

A melt blown fiber (BMF) pressure-sensitive adhesive (PSA) web comprised of three-layer polymeric fibers was prepared using a melt blowing process similar to that described, for example, in Wente, Van A., "Superfine Thermoplastic Fibers," in *Industrial Engineering Chemistry*, Vol. 48, pages 1342 et seq. (1956) or in Report No. 4364 of the Naval Research Laboratories, published May 25, 1954, entitled "Manufacture of Superfine Organic Fibers" by Wente, Van A.; Boone, C. D.; and Fluharty, E. L., except that the BMF apparatus utilized two extruders, each of which fed its extrudate to a gear pump that controlled the polymer melt flow. The gear pumps fed a three-layer feedblock (splitter) assembly similar to that described in U.S. Pat. No. 3,480,502 (Chisholm, et al.) and U.S. Pat. No. 3,487,505 (Schrenk), which are incorporated herein by reference. The feedblock assembly was connected to a melt blowing die having circular smooth surface orifices (10/cm) with a 5:1 length to diameter ratio. The primary air was maintained at 240° C. and 241 KPa with a 0.076-cm gap width to produce a uniform web. Both the die and the feedblock assembly were maintained at 240° C., and the die was operated at a rate of 178-g/hr/cm die width.

The feedblock assembly was fed by two polymer melt streams, one being a melt stream of HL-1487 block copolymer PSA (HB Fuller Company, St. Paul, Minn.) at 190° C. and a rate of 3.64 kg/hr; and the other being a melt stream of EXACT™ 4023 ultra low density polyethylene resin (Exxon Chemicals, Bayton, Tex.) at 230° C. and a rate of 2.27 kg/hr. The gear pumps were adjusted to produce a 1.6 to 1.0 ratio of HL 1487 PSA to polyethylene resin (based on a pump ratio percent), and the BMF-PSA web was directed to a rotating collector drum at a collector-to-die distance of 23.5 cm. The feedblock assembly split the melt streams and combined them in an alternating manner into a three-layer melt stream exiting the feedblock assembly, the outermost layers of the exiting stream being the PSA. The resulting BMF-PSA web had a basis weight of about 50 $g/m^2$.

A layer of polypropylene spunbond nonwoven (17 $g/m^2$ basis weight, Product No. 4001720, Avgol Nonwoven Industries, Holon, Israel) and a layer of 280 denier GLOSPAN™ elastic filaments (Globe Manufacturing Company, Gastonia, N.C.) spaced at approximately 3.94 filaments/cm were conveyed in front of the above BMF die at a collector-to-die distance of 23.5 cm. The ratio of the filaments unwind rate to the nonwoven unwind rate was approximately 1:2.5 which resulted in the filaments stretching prior to reaching the BMF die. The two layers were positioned such that the filament layer was between the nonwoven layer and the BMF die when wrapped around the collector drum and the BMF-PSA web was blown onto the composite to bind the stretched filaments to the nonwoven. This composite was then transported approximately 38.1 cm to a nip point where another layer of polypropylene spunbond nonwoven was brought into contact with the BMF-PSA side of the construction. A nip force of 558 N was applied across a 51-cm width of composite at a nip speed of 3.8 m/min to facilitate the adhesion of all layers together. Upon exiting the nip, the laminate was allowed to relax thereby causing the filaments to contract. The resulting shirred elastic laminate was collected by winding around a 7.62-cm cardboard core and was subsequently cut into samples for test evaluations.

Example 2

Porous Elastic Wrap (Nonwoven//BMF-PSA//Filaments//Nonwoven Laminate)

A porous elastic wrap was prepared according to the process described in Example 1, except that two layers of polyester spunlaced nonwoven (34 g/m$^2$ basis weight, Product No. 5601, PGI Nonwovens, Mooresville, N.C.) were substituted for the two polypropylene spunbond nonwoven layers. The shirred elastic laminate was very soft in feel and was observed to adhere very well to the "hook side" of a mechanical fastener, for example, Hook XMH-4132 (Minnesota Mining and Manufacturing Company, St. Paul, Minn.). Samples of the laminate were cut for subsequent test evaluations.

Example 3

Porous Elastic Wrap (Nonwoven//BMF-PSA//Filaments//Scrim// Nonwoven Laminate)

A porous elastic wrap was prepared according to the process described in Example 1, except that a weft-inserted polyester scrim layer with 18 yarns/2.5-cm (40 denier, machine-direction) and 9 yarns/2.5-cm (150 denier, cross-direction) (Product No. 924864, Milliken Company, Spartanburg, S.C.) was inserted between the first layer of polypropylene spunbond nonwoven and the elastic filaments layer. The three layers were wrapped around the collector drum and conveyed in front of the BMF die at a collector-to-die distance of 12.7 cm. The BMF-PSA web was blown onto the filaments side of the composite to bind the scrim and stretched filaments to the nonwoven. This composite was then transported approximately 38.1 cm to a nip point where another layer of polypropylene spunbond nonwoven was brought into contact with the BMF-PSA side of the construction. A nip force of 551 N was applied across a 51-cm width of composite at a nip speed of 3.8 m/min to facilitate the adhesion of all layers together. Upon exiting the nip, the laminate was allowed to relax thereby causing the filaments to contract. The resulting shirred elastic laminate was collected by winding around a 7.62-cm cardboard core and was subsequently cut into samples for test evaluations. The shirred elastic laminate was very soft in feel and was observed to adhere very well to the "hook side" of a mechanical fastener, for example, Hook XMH-4132 (Minnesota Mining and Manufacturing Company, St. Paul, Minn.). A 5.1-cm wide×10.2-cm long sample was observed to tear evenly across the width of the sample and left a very clean edge.

Example 4

Porous Elastic Wrap (Nonwoven//BMF-PSA//Filaments//Nonwoven Laminate)

A porous elastic wrap comprising a laminate having nonwoven polypropylene outer layers, elastic filaments, and a melt blown adhesive was prepared according to the following process.

A BMF-PSA web comprised of HL-8156 block copolymer PSA (HB Fuller Company) was prepared by processing the solid adhesive through a grid melt system (J&M Laboratories, Inc., Dawsonville, Ga.) and then through a 30.5-cm wide BMF die at a rate of 0.86 kg/hr. The grid melt system had a hopper holding capacity of 40 kg and a melting capacity of 40 kg/hr. The melt pump volume was 1.68 cc/rev. and the process temperature was 160° C. The BMF-PSA was discharged from the die approximately 25.9 cm above a vertical nip point formed by two 40.6-cm wide silicone coated rolls.

A layer of polypropylene spunbond nonwoven (15 g/m$^2$ basis weight, Product No. 3615, Freudenberg Spunwebs, Kaiserslautern, Germany) was fed around the bottom roller of the nip from the "up-stream" side of the BMF die. At the same time, a second layer of polypropylene spunbond nonwoven (Product No. 3615) and a layer of 280 denier GLOSPAN™ elastic filaments was fed around the top roller of the nip from the "down-stream" side of the BMF die. The collector-to-die distance was 25.9 cm. The elastic filaments had a cross-web density of 2.75 filaments/cm and a stretch ratio of 2.5:1. The filaments were situated on top of the nonwoven layer so that the BMF-PSA was blown onto the "up-stream" layer of nonwoven and then contacted the elastic filaments to bond the entire composite together. The nip force was 418 N across a 30.5-cm wide composite and the nip speed was 9.1 m/min. After passing through the nip, the final construction of the laminate was: nonwoven//BMF-PSA//elastic filaments//nonwoven. Upon exiting the nip, the laminate was allowed to relax thereby causing the filaments to contract. It was observed that the low baseweight nonwoven outer layers ("coverwebs") and flexible BMF-PSA fibers were easily buckled into soft pleats. The resulting shirred elastic laminate was collected by winding around a 7.62-cm cardboard core and was subsequently cut into samples for test evaluations.

Example 5

Porous Elastic Wrap (Nonwoven//BMF-PSA//Filaments//Nonwoven Laminate)

A porous elastic wrap comprising a laminate having nonwoven polypropylene outer layers, elastic filaments, and a melt blown adhesive was prepared according to Example 4, except that GLOSPAN™ 420 denier elastic filaments were used in place of the GLOSPAN™ 280 denier filaments and HL-1470 block copolymer PSA (HB Fuller) was used in place of the HL-8156 adhesive. The resulting shirred elastic laminate was collected and cut into samples for test evaluations.

Example 6

Porous Elastic Cohesive Bandage (Nonwoven//BMF-PSA//Filaments//Nonwoven Laminate)

A porous elastic cohesive bandage comprising a laminate having nonwoven polypropylene and nonwoven nylon outer layers, elastic filaments, and a melt blown adhesive was prepared according to the following process.

A BMF-PSA web was prepared essentially as described in Example 1, except that EASTOFLEX™ D-127 polyalphaolefin PSA (Eastman Chemical, Kingsport, Tenn.) was extruded as a single component BMF-PSA. Both the die and feedblock assembly were maintained at 190° C. and the die was operated at a rate of 92-g/hr/cm die width. The adhesive melt stream was fed to the feedblock at a rate of 4.54 kg/hr and at a temperature of 190° C. The primary air was maintained at 220° C. and 138 KPa with a 0.076 cm gap width, to produce a uniform web. The resulting BMF-PSA web was directed to a rotating collector drum at a collector-to-die distance of 12.8 cm and had a basis weight of about 39 g/m$^2$.

A layer of polypropylene spunbond nonwoven (10 g/m$^2$ basis weight with 2 denier fibers and a 10% bond pattern, Hills Ason, West Melbourne, Fla.) and a layer of 280 denier GLOSPAN™ elastic filaments (Globe Manufacturing Company) spaced at approximately 2.74 filaments/cm (each section of filament had two elastic yarns) were conveyed in front of the above BMF die at a collector-to-die distance of 20.3 cm. The ratio of the filaments unwind rate to the nonwovens unwind rate was approximately 3:1 which resulted in the filaments stretching prior to reaching the BMF die. The two layers were positioned such that the filament layer was between the nonwoven layer and the BMF die when wrapped around the collector drum and the BMF-PSA web was blown onto the composite to bind the stretched filaments to the nonwoven. This composite was then transported approximately 38.1 cm to a nip point where another layer of polypropylene spunbond was brought into contact with the BMF-PSA side of the construction. A nip force of 1958 N was applied across a 50.8-cm width of composite at a nip speed of 4.6 m/min to facilitate the adhesion of all layers together. Upon exiting the nip, the laminate was allowed to relax thereby causing the filaments to contract. The resulting shirred elastic laminate was collected by winding around a 7.62-cm cardboard core and was subsequently cut into samples for test evaluations.

It was observed that the BMF-PSA squeezed through the nonwoven outer layers and remained on the outer surfaces of the laminate. When two samples of laminate came into contact with each other a cohesive bond was formed between the two laminates. The two laminates could easily be removed from one another and when rejoined together continued to exhibit cohesive properties. This joining together and separating of two laminate samples could be repeated a number of times in succession.

Example 7

Porous Elastic Cohesive Bandage (Nonwoven//BMF-PSA//Filaments//Nonwoven Laminate)

A porous elastic cohesive bandage comprising a laminate having nonwoven nylon outer layers, elastic filaments, and a melt blown adhesive was prepared according to Example 4, except that the BMF-PSA adhesive was HL-1470 (HB Fuller), the elastic filaments were GLOSPAN™ 420 denier filaments, and the nonwoven outer layers were nylon spunbond nonwoven (10 g/m$^2$ basis weight, designated PBN-II type 303, Cerex Advanced Fabrics, L.P., Pensacola, Fla.). A nip force of 2631 N was applied across a 35.5-cm width of composite at a nip speed of 6.1 m/min to facilitate the adhesion of all layers together. The BMF-PSA basis weight was 18 g/m$^2$ and the elastic filaments stretch ratio was 3:1. The resulting shirred elastic laminate was collected and cut into samples for test evaluations. The laminate was observed to have cohesive properties as described for the laminate of Example 6.

Example 8

Porous Elastic Cohesive Bandage (Nonwoven//BMF-PSA//Filaments//Nonwoven Laminate)

A porous elastic cohesive bandage comprising a laminate having nonwoven polyester outer layers, elastic filaments, and a melt blown adhesive was prepared according to Example 4, except that the BMF-PSA adhesive was HL-1470 (HB Fuller), the elastic filaments were GLOSPAN™ 420 denier filaments, and the nonwoven outer layers were carded polyester webs with acrylic resin binder (12 g/m$^2$ basis weight, Minnesota Mining and Manufacturing Company, St. Paul, Minn.). A nip force of 438 N was applied across a 35.5-cm width of composite at a nip speed of 6.1 m/min to facilitate the adhesion of all layers together. The BMF-PSA basis weight was 13 g/m$^2$ and the elastic filaments stretch ratio was 3:1. The resulting shirred elastic laminate was collected and cut into samples for test evaluations. The laminate was observed to have cohesive properties as described for the laminate of Example 6.

Example 9

Porous Elastic Cohesive Bandage (Nonwoven//BMF-PSA//Filaments//Nonwoven Laminate)

A porous elastic cohesive bandage comprising a laminate having nonwoven polyester outer layers, elastic filaments, and a melt blown adhesive was prepared according to Example 4, except that the nonwoven outer layers were comprised of the polyester nonwoven used in Example 8. A nip force of 2631 N was applied across a 35.5-cm width of composite at a nip speed of 6.1 m/min to facilitate the adhesion of all layers together. The BMF-PSA basis weight was 16 g/m$^2$ and the elastic filaments stretch ratio was 2:1. The resulting shirred elastic laminate was collected and cut into samples for test evaluations. The laminate was observed to have cohesive properties as described for the laminate of Example 6.

Example 10

Porous Adhesive Tape (Nonwoven//BMF-PSA//Scrim//Nonwoven//PSA Laminate)

A porous, adhesive tape comprising a laminate having nonwoven polypropylene outer layers, a weft-inserted scrim, a melt blown adhesive, and a PSA coating was prepared according to the following process.

A single component BMF-PSA web comprised of EAST-OFLEX™ D-127 polyalphaolefin PSA (Eastman Chemical) polymeric fibers was prepared essentially as described in Example 6. The resulting BMF-PSA web had a basis weight of about 15 g/m$^2$ A layer of polypropylene spunbond nonwoven (15 g/m$^2$ basis weight, Product No. 3615, Freudenberg Spunwebs, Kaiserslautern, Germany) was wrapped around a collector drum in front of the BMF die at a collector-to-die distance of 23.5 cm. A weft-inserted polyester scrim layer (Product No. 924864, Milliken Company) was then wrapped around the collector drum on top of the nonwoven layer. The two layers were positioned such that the scrim layer was between the nonwoven layer and the BMF die and the BMF-PSA web was blown onto the composite to bind the scrim layer to the nonwoven. This composite was then transported approximately 38.1 cm to a nip point where another layer of polypropylene spunbond nonwoven was brought into contact with the BMF-PSA side of the construction. A nip force of 558 N was applied across a 51-cm width of composite at a nip speed of 2.7 m/min to facilitate the adhesion of all layers together. The resulting laminate was collected by winding around a 7.62-cm cardboard core and was subsequently cut into samples for coating with a PSA layer.

An acrylate adhesive comprised of 60% isooctyl acrylate/ acrylic acid copolymer (94/6 weight ratio) (Minnesota Mining and Manufacturing Company, St. Paul, Minn.) and 40% FORAL™ 85 rosin ester (supplied as a 35% solids in heptane/isopropyl alcohol (90/10 volume ratio), Hercules, Inc., Wilmington, Del.) was solvent coated onto a silicone release liner (Product No. 2-60BKG-157&99AM, Daubert, Dixon, Ill.). The adhesive coating of 50 micrometers/10.16-cm×15.24-cm area was prepared with a 25.4-cm wide knife coater at a gap of 10 mils. The adhesive-coated liner was dried using a dual oven system with the first oven at 46° C. and the second oven at 76° C. The acrylate adhesive was then transferred to the outer nonwoven layer ("scrim-side") of the laminate described above with a heated laminating roll at 38° C. and 621 KPa. The resulting adhesive-coated laminate was cut into samples and evaluated (machine direction) for tensile strength at break, percent elongation at break, porosity. Hand tearability was evaluated in the cross direction. The results are shown in Table 1.

Example 11

Porous Adhesive Tape (Nonwoven//Scrim//BMF-PSA//PSA Laminate)

A porous adhesive tape comprising a laminate having nonwoven polypropylene outer layer, a weft-inserted scrim, a melt blown adhesive, and a PSA coating was prepared according to the following process.

A BMF-PSA web was prepared essentially as described in Example 4, except that the HL-1470 PSA (HB Fuller) was substituted for the HL-8156 adhesive. The resulting BMF-PSA web had a basis weight of about 13 g/m².

A layer of polypropylene spunbond nonwoven (17 g/m² basis weight, Avgol Nonwoven Industries, Holon, Israel) was fed around a bottom roller of a laminator from the "down-stream" side of the BMF die at a collector-to-die distance of 10.2 cm. A weft-inserted polyester scrim layer (knitted with 70-denier texturized polyester yarn in the chain and the weft with a knit density of 4 chain yarns/cm and 3.8 weft yarns/cm) was then unwound from the same side of the laminator as the nonwoven layer and located such that the BMF-PSA web was blown onto the scrim layer. A third layer of silicone release liner (Product No. 2-43MG-1F, Daubert Coated Products, Inc., Westchester, Ill.) was wound on the adhesive side of the composite to help prevent the adhesive from contacting the nip rollers. The composite passed through the nip at a nip force of 900 N across a 30.5-cm wide composite and at a nip speed of 4.57 m/min. The composite was heated with a hot air gun which caused the texturized yarns to heat shrink. As the texturized yarns shrunk from the heat, the composite shirred in a manner similar to composites containing elastic filaments.

The resulting laminate was collected by winding around a 7.62-cm cardboard core and was subsequently cut into samples for coating with a PSA layer.

A PSA layer was transferred onto the BMF-PSA web layer (release liner removed) of the above laminate by utilizing the same PSA and the same coating/transfer process as described in Example 10. The resulting adhesive-coated laminate was then coated on the nonwoven outer layer with a low adhesion backside (LAB) to improve the unwind characteristics of the laminate. The LAB utilized a polyurethane release agent consisting of the reaction product of a 50/50 mixture of octadecyl isocyanate and a 50% hydrolyzed polyvinyl acetate. The polyurethane was dissolved at 5% solids in a heptane/xylene/isopropyl alcohol solvent (72/25/3 volume ratio) and then solvent coated onto the laminate using a 80-line knurled roll with rubber backup roll at 138 KPa and a line speed of 3.7 m/min. The LAB-coated laminate was dried using the dual oven system described in Example 10. The resulting LAB coating weight was approximately 12 micrometers per a 10.16-cm×15.24-cm area.

The resulting porous adhesive tape was cut into samples and evaluated (machine direction) for tensile strength at break, percent elongation at break, and porosity. Hand tearability was measured in the cross direction. The results are shown in Table 1.

Example 12

Porous Elastic Cohesive Wrap (BMF-PSA//Filaments Laminate)

A porous elastic cohesive wrap comprising a laminate having elastic filaments and a melt blown pressure-sensitive adhesive was prepared according to the following process.

A BMF-PSA web comprised of three-layer polymeric fibers was prepared essentially as described in Example 1, except that HL-2547 block copolymer PSA (HB Fuller) was substituted for the HL-1487 adhesive, a polyurethane polymer (Product No. PS440-200, Morton International, Seabrook, N.H.) was substituted for the EXACT™ 4023 polyethylene resin, and the following process conditions were used. Both the die and the feedblock assembly were maintained at 225° C., and the die was operated at a rate of 128-g/hr/cm die width. The HL-2547 PSA melt stream was fed to the feedblock at 190° C. and a rate of 1.95 kg/hr, and the polyurethane melt stream was fed to the feedblock at 225° C. and a rate of 4.54 kg/hr. The gear pumps were adjusted to produce a 0.43 to 1.0 ratio of HL-2547 PSA to polyurethane resin, and the BMF-PSA web was directed to a rotating collector drum at a collector-to-die distance of 7 cm. The resulting BMF-PSA web had a basis weight of about 100 g/m².

A layer of 280 denier GLOSPAN™ elastic filaments (Globe Manufacturing Company) spaced at approximately 3.94 filaments/cm were conveyed in front of the above BMF die at a collector-to-die distance of 23.5 cm. The ratio of the collector speed to the filaments unwind rate was approximately 2.5:1 which resulted in the filaments stretching prior to reaching the BMF die. This composite was then transported approximately 38.1 cm to a nip point where a nip force of 251 N was applied across a 51-cm width of composite at a nip speed of 2.1 m/min to facilitate the adhesion of the filaments to the BMF-PSA web. Upon exiting the nip, the laminate was allowed to relax thereby causing the filaments to contract. A 7.62-cm×2.54-cm sample of the laminate was removed, wrapped around a 1.27-cm diameter cylinder, and subsequently utilized for test evaluations. When two samples of laminate came into contact with each other a cohesive bond was formed between the two laminates. The two laminates could easily be removed from one another without tearing and when rejoined together continued to exhibit cohesive properties. This joining together and separating of two laminate samples could be repeated a number of times in succession.

Example 13

Porous Elastic Cohesive Wrap

(BMF-PSA//Filaments/Scrim Laminate)

A porous elastic cohesive wrap comprising a laminate having elastic filaments, a weft-inserted scrim, and a melt blown pressure-sensitive adhesive was prepared according to the following process.

A BMF-PSA web comprised of three-layer polymeric fibers was prepared essentially as described in Example 1, except that HL-2547 block copolymer PSA (HB Fuller) was substituted for the HL-1487 adhesive, a polyurethane polymer (Product No. PS440-200, Morton International, Seabrook, N.H.) was substituted for the EXACT™ 4023 polyethylene resin, and the following process conditions were used. Both the die and the feedblock assembly were maintained at 235° C., and the die was operated at a rate of 177-g/hr/cm die width. The HL-2547 PSA melt stream was fed to the feedblock at 190° C. and a rate of 3.15 kg/hr, and the polyurethane melt stream was fed to the feedblock at 235° C. and a rate of 5.84 kg/hr. The gear pumps were adjusted to produce a 0.54 to 1.0 ratio of HL-2547 PSA to polyurethane resin, and the BMF-PSA web was directed to a rotating collector drum at a collector-to-die distance of 7.6 cm. The resulting BMF-PSA web had a basis weight of about 55 g/m².

A layer of 280 denier GLOSPAN™ elastic filaments (Globe Manufacturing Company) spaced at approximately 3.94 filaments/cm, a weft-inserted polyester scrim layer (Product No. 924864, Milliken Company), and a pre-made layer of the above BMF-PSA web were wrapped around a collector drum such that the BMF-PSA web layer contacted the drum and the filaments were sandwiched between the scrim and the BMF-PSA web. The ratio of the collector speed to the filaments unwind rate was approximately 2:1 which resulted in the filaments stretching prior to reaching the BMF-PSA web. This composite was then transported approximately 38.1 cm to a nip point where a nip force of 558 N was applied across a 51-cm width of composite at a nip speed of 5.2 m/min to facilitate the adhesion of the filaments to the BMF-PSA web. Upon exiting the nip, the laminate was allowed to relax thereby causing the filaments to contract. The resulting laminate was collected as described in Example 12 and subsequently utilized for test evaluations. A 5.1-cm wide×10.2-cm long sample was observed to tear evenly across the width of the sample and left a clean edge. When two samples of laminate came into contact with each other a cohesive bond was formed between the two laminates. The two laminates could easily be removed from one another without tearing and when rejoined together continued to exhibit cohesive properties. This joining together and separating of two laminate samples could be repeated a number of times in succession.

Example 14

Porous Elastic Adhesive Tape

(Nonwoven//Filaments//Scrim//BMF-PSA Laminate)

A porous, elastic adhesive tape comprising a laminate having one nonwoven polypropylene outer layer, elastic filaments, a weft-inserted scrim, and a melt blown adhesive was prepared according to the following process.

A BMF-PSA web was prepared essentially as described in Example 4. The resulting BMF-PSA web had a basis weight of about 56 g/m².

A layer of polypropylene spunbond nonwoven (17 g/m² basis weight, Product No. 4001720, Avgol Nonwoven Industries, Holon, Israel) was fed around a bottom roller of a laminator from the "down-stream" side of the BMF die at a collector-to-die distance of 22 cm. A layer of 280 denier GLOSPAN™ elastic filaments (Globe Manufacturing Company) spaced at approximately 3.94 filaments/cm were conveyed in front of the BMF die at a collector-to-die distance of 22 cm. The ratio of the collector speed to the filaments unwind rate was approximately 2.5:1 which resulted in the filaments stretching prior to reaching the BMF die. A weft-inserted polyester scrim (Product No. 924864, Milliken) was then wrapped around the collector drum on top of the filaments layer and located such that the BMF-PSA web was blown onto the scrim layer. The composite passed through the nip point with a nip force of 1754 N across a 35.6-cm wide composite and at a nip speed of 12.2 m/min. The resulting laminate was collected in its relaxed state by winding around a 7.62-cm cardboard core and was subsequently cut into samples for test evaluations.

Example 15

Porous Elastic Wrap

(Nonwoven//BMF-PSA//Filaments//Hydrophilic Nonwoven Laminate)

A porous elastic wrap comprising a laminate having one nonwoven polypropylene outer layer, one hydrophilic nonwoven outer layer, elastic filaments, and a melt blown adhesive was prepared according to Example 4, except that GLOSPAN™ 420 denier elastic filaments (Globe Manufacturing Company) were used in place of the GLOSPAN™ 280 denier filaments, HL-1470 adhesive (HB Fuller) was used in place of the HL-8156 adhesive, and a hydrophilic polyester needletacked nonwoven (TYPELLE™ nonwoven, 48 g/m² basis weight, Reemay Nonwovens, Old Hickory, Tenn.) was used in place of the second nonwoven polypropylene outer layer. The resulting shirred elastic laminate was collected and subsequently cut into samples for test evaluations.

Example 16

Porous Elastic Wrap

(Nonwoven//Filaments//Fibrous Adhesive//Woven Scrim)

A porous elastic wrap comprising a laminate having a nonwoven nylon outer layer, elastic filaments, a fibrous spray adhesive and a woven polyester scrim, was prepared according to the following process.

A fibrous adhesive web was prepared from Bostik Hot Melt 9041 adhesive (Bostik, Inc. Middleton, Mass.) using a Dynamelt DM M50 series Hot Melt Adhesive Supply Unit (ITW Dynatec, Hendersonville, Tenn.) and 24 MR1300 Series application modules equipped on a 24 Port UFD Head with Zero Gap Die (Part #803409) and 17-1 spray tips (Part #505225, ITW Dynatec, Hendersonville, Tenn.). The Bostik adhesive was premelted in the supply unit using a progressive heat melt (4 zones: 188° C., 191° C., 193° C., and 196°

C.), pumped at a rate of 22 rpm through heated hoses set at 193° C., and fed to the die consisting of 24 modules equipped with 17-1 spray tips at 216° C. The adhesive was sprayed at a width of 61 cm using 69 KPa of air at 216° C. to attenuate the fibers. The adhesive basis weight was 12–13 g/m$^2$.

A layer of woven polyester scrim with 22 filament polyester yarns (70 denier, machine-direction) and 10 yarns (150 denier, cross-direction) (Product Style Code 490, American Fiber & Finishing S.C., Inc., Newberry, S.C.) was conveyed below the adhesive web die at a distance of 7.6 cm. The adhesive was sprayed onto the woven scrim at a basis weight of 12–13 g/m$^2$. A layer of Trilobal PBN-II nylon spunbond nonwoven (Product Type 3103, Cerex Advanced Fabric, L.P., Pensacola, Fla.) and a layer of 280 denier GLOSPAN™ elastic filaments (Globe Manufacturing Company, Gastonia, N.C.) spaced at approximately 3.94 filaments/cm were conveyed into the nip at 276 KPa. The ratio of the filaments unwind rate to the nonwoven unwind rate was approximately 2.0:1 which resulted in the filaments stretching prior to reaching the nip. The nonwoven/elastic filaments composite was positioned such that the filament layer was between the nonwoven layer and the adhesive side of the woven scrim/adhesive composite. The two composites were then transported to a nip point at 276 KPa across 12.2 cm at a nip speed of 15.2 m/min to facilitate the adhesion of all layers together. Upon exiting the nip, the laminate was allowed to relax thereby causing the filaments to contract. The resulting shirred elastic laminate was collected by winding around a 7.62-cm cardboard core and was subsequently cut into samples for test evaluations.

Example 17

Porous Elastic Wrap with Discrete Hooks as Mechanical Fasteners (Discrete Hooks//Nonwoven//Filaments//Fibrous Adhesive//Woven Scrim)

To the shirred elastic laminate of Example 16 were added discrete hook (stem) regions by the method described in U.S. patent application Ser. No. 09/257,447 now abandoned, (Tuman, et al.), incorporated herein by reference, to afford an elastic wrap that could be fastened to itself by a "hook-and-loop" mechanism. Briefly, the method for constructing the wrap was as follows.

A stem-formable material of low density polyethylene, ASPUN™ 6806 (Dow Chemical Company, Midland, Mich.) was passed through a grid melt system at a rate of 0.7 kg/hr and then through a 30.5-cm wide die equipped with a small orifice die tip having a single row of circular smooth surface orifices (8 orifices/cm, 0.5-mm average diameter). The melt pump volume was 1.68 cc/rev and the process temperature was 205° C. The molten material was discharged from the die directly onto the nylon nonwoven layer of the elastic laminate web described in Example 16. The web was then conveyed approximately 20 cm at a speed of 4.6 m/min into a vertical nip point formed by two 40.6-cm wide silicone coated rolls. The nip force was 1.7 kN across a 30.5 cm wide web. The first roll had a tooled surface that contained cavities with diameters of about 0.25 mm, depths in excess of about 0.80 mm and spacing of about 0.635 mm, resulting in a stem array having a stem density of about 248 stems/cm2 (about 1600 stems/in$^2$). The cavities were angled at 45 degrees from the tangent of the roll surface in alternating directions. The second roll had a smooth surface. The web was fed around the smooth roller of the nip with the scrim side facing the surface of the smooth roll. The discrete regions of stem-formable material faced the tooled surface and contacted the cavities as the web entered the nip. The resulting stem-surfaced web had rod-like stem projections on the regions of stem-formable material. The stem-surfaced regions were cross direction stripes approximately 0.5-cm wide and separated by approximately 2 cm from each other. Each region had on average approximately 8 stems across its width and 16 rows/cm cross web. The stem-surfaced web was breathable and elastic. When wrapped around an object in either direction, and fastened by pressing both sides together, the web had a cinching action suitable as a compression wrapping construction. The web could be fastened and unfastened multiple times.

Test Data

The porous elastic wraps from Examples 1–5 were cut into appropriate sample sizes and evaluated (machine direction) for Tensile Strength, Percent Elongation at Break, Coverweb Bond, Percent Stretch, and Porosity. The porous elastic wrap from Example 15 was evaluated for Tensile Strength, Percent Elongation at Break, Percent Stretch, Porosity, and in the cross direction, Hand Tearability. The porous elastic wrap from Example 16 was evaluated for Tensile Strength, Percent Elongation at Break, Percent Strength, Coverweb Bond, and Porosity. Results are provided in Table 1 and are compared with results for the commercial tapes. In the table, NA=Not Applicable and NM=Not Measured.

The porous elastic cohesive wraps from Examples 6–9 and 12–13 were cut into appropriate sample sizes and evaluated (machine direction) for Tensile Strength, Percent Elongation at Break, Coverweb Bond, Percent Stretch, Cohesive Strength, and Porosity. Results are provided in Table 1 and are compared with results for the commercial tapes, COBAN™ cohesive wrap (Minnesota Mining and Manufacturing Company, St. Paul, Minn.) and COFLEX™ cohesive wrap (Andover, Salisbury, Mass.).

The porous adhesive tapes from Examples 10, 11, and 14 were cut into appropriate sample sizes and evaluated (machine direction) for Tensile Strength, and Percent Elongation at Break and Porosity. Hand Tearability was evaluated in the cross direction. Results are provided in Table 1.

Additionally, the results for samples from Examples 1–16 are compared in Table 1 with results for the commercial tapes, ACE bandage (Johnson & Johnson, Arlington, Tex.), FLEXUS™ cohesive wrap (Kimberly-Clark, Roswell, Ga.), COBAN cohesive wrap (Minnesota Mining and Manufacturing Company, St. Paul, Minn.), ELASTOPLAST™ adhesive tape (Johnson & Johnson), and LIGHTPLAST™ adhesive tape (Beiersdorf-Jobst, Inc., Charlotte, N.C.).

TABLE 1

Evaluation Results for Elastic Wraps (Example 1–5, 15–16), Elastic Cohesive Wraps (Examples 6–9, 12–13) and Adhesive Tapes (Examples 10–11, 14)

| Example | Tensile Strength (N/2.5 cm) | Elongation (%) | Coverweb Bond (mm) | Stretch (%) | Cohesive Strength (g/cm$^2$) | Porosity (sec) | Tear (Rating 1–5) |
|---|---|---|---|---|---|---|---|
| 1 | 45 ± 8 | 220 ± 24 | 0 | 121 ± 5 | NA | 0.13 ± .05 | NA |
| 2 | 112 ± 5 | 146 ± 11 | 4 ± 2 | 93 ± 12 | NA | 0.18 ± .05 | NA |
| 3 | 98 ± 5 | 97 ± 2 | 0 | 50 ± 10 | NA | 0.10 | NA |
| 4 | 93 ± 5 | 117 ± 9 | 0 | 135 ± 3 | NA | 0.10 | NA |
| 5 | 36 ± 3 | 324 ± 18 | 18 ± 5 | >160 | NA | 0.20 | NA |
| 6 | 100 ± 4 | 107 ± 7 | 0 | 52 ± 6 | 2 ± 1 | 0.7 ± 0.2 | NA |
| 7 | 56 ± 14 | 168 ± 38 | 1.3 ± 1 | 70 | 33 ± 2 | 0.1 | NA |
| 8 | 29 ± 1 | 152 ± 34 | 2.0 ± 1 | 127 ± 28 | 17 ± 2 | 0.1 ± 0.1 | NA |
| 9 | 32 ± 6 | 131 ± 8 | 3.7 ± 2 | 103 ± 6 | 22 ± 8 | 0.1 | NA |
| 10 | 105 ± 3 | 26 ± 1 | NA | NA | NA | 5.4 ± 2 | 2 |
| 11 | 88 ± 10 | 31 ± 1 | NA | NA | NA | 111 ± 14 | 2 |
| 12 | 63 ± 11 | 130 ± 8 | 0 | 60 | 31 ± 2 | 0.2 ± .05 | NA |
| 13 | 15 ± 1 | 314 ± 13 | 0 | 96 ± 17 | 4 ± 1 | 0.2 ± .05 | NA |
| 14 | 79 ± 4 | 113 ± 3 | NM | 85 ± 5 | NA | 0.4 ± .1 | 2 |
| 15 | 81 ± 1 | 355 ± 15 | NM | 72 ± 2 | NA | 0.2 ± .05 | 1 |
| 16 | 62 | 170 | 3 | 114 | NA | 0.1 | NA |
| ACE ™ | 220 ± 46 | 150 ± 03 | 0 | 150 ± 8 | NA | 0.20 | NA |
| FLEXUS ™ | 36 ± 4 | 187 ± 11 | 0 | 106 ± 4 | NA | 0.23 ± .05 | NA |
| COBAN ™ | 48 ± 2 | 180 ± 12 | 0 | 115 ± 5 | 93 ± 11 | 0.1 | NA |
| COFLEX ™ | 49 ± 6 | 280 ± 20 | 0 | 143 ± 3 | 64 ± 8 | 0.1 | NA |
| ELASTOPLAST ™ | 213 ± 5 | 94 ± 6 | 0 | 8 ± 1 | NA | 87 ± 2 | 1 |
| LIGHTPLAST ™ | 54 ± 2 | 95 ± 8 | 0 | 83 ± 2 | NA | 1 ± 1 | 2 |

It can be concluded from the test results provided in Table 1 that constructions for the elastic non-cohesive wraps, elastic cohesive wraps, and adhesive tapes of this invention possess the necessary tensile strength, elongation, porosity, and tear properties that are required for conventional medical bandage and tape applications. It is clear that a wide range of desirable physical properties can be achieved by tailoring the melt blown adhesive, the weft-inserted scrim, the elastic filaments, and the processing conditions to meet a particular end-use objective.

Preferred Discrete Stem Regions

In a preferred embodiment of the invention, at least one of the major sides of one of the web (most preferably the first nonwoven web) has a plurality of discrete patches or regions from which protrude a multiplicity of stems. In between the patches or regions are intermediate discrete regions or inter-regions that contain few, if any, stems. U.S. patent application Ser. No. 09/257,447, filed Feb. 25, 1999now abandoned, on "Web having Discrete Stem Regions", is incorporated by reference herein.

Figure 15:
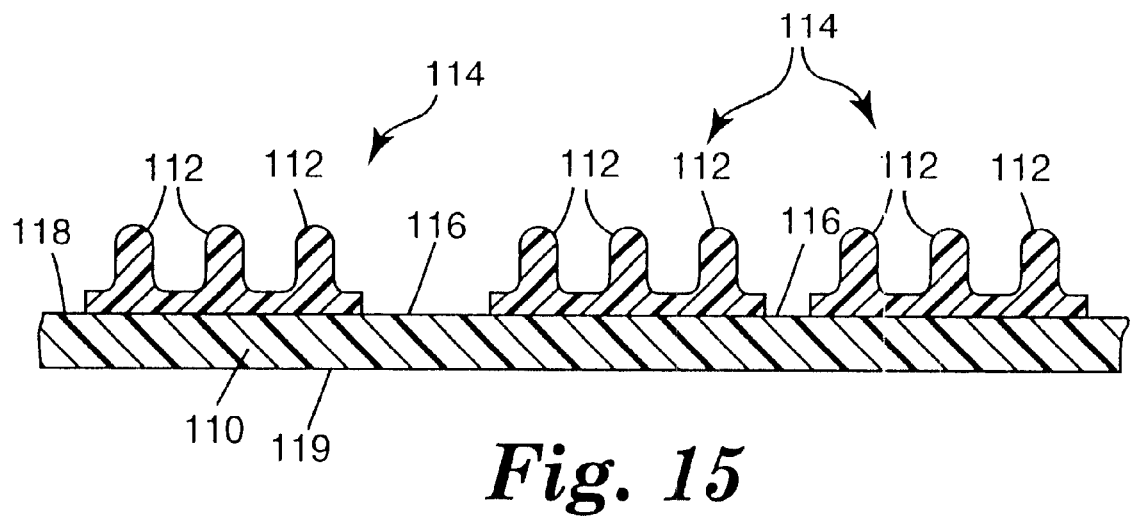
FIG. 15 is a cross-sectional side view of a plurality of regions of stems configured and arranged in accordance with an embodiment of the invention.

FIG. 15 shows a web 110 having stems 112 arranged in numerous discrete patches or regions 114 on web surface 118. The discrete patches or regions 114 of stems 112 are separated from one another by inter-regions 116. The stems 112 are protrusions extending from web 110, and web 110 is a substrate that may be configured for the formation and holding of the stems 112. In FIG. 15, regions 114 are connected to one another only by web 110. Thus, inter-regions 116 reveal exposed portions of web 110, unobstructed by any of the thermoplastic material used to form stems 112.

In FIG. 15, the stems 112 are positioned on only an upper surface 118 of web 110, and are not positioned on a lower surface 119. It will be appreciated, however, that stems 112 can be positioned on either or both the upper and lower surfaces 118, 119 in various embodiments of the invention. Also, stems 112 can be formed such that they are a useful component of a mechanical fastener. For example, the stems 112 may be hooks for use with hook and loop fasteners. Alternatively, the stems 112 can be formed into mushroom-shaped mechanical fasteners. In still other embodiments of the invention, the stems 112 can be oriented at one or more angles to the localized plane defined by web 110.

In specific embodiments of the invention, the discrete regions 114 cover between 120 and 180 percent of the surface of the web 110 on which they are positioned. In other embodiments, the discrete regions 114 cover between 1 and 99 percent, between 5 and 70 percent, between 10 and 50 percent, or between 5 and 25 percent of the surface of the web 110 on which they are positioned. The discrete regions 114 may be separated from one another by various distances. For example, the regions 114 may be separated by an average of approximately 0.05 and 30 centimeters; or by an average of between 1 and 4 centimeters. In certain embodiments, the distance between the regions 114 is identified as a multiple of the distance between stems, such as 10 times the distance between the center of adjacent stems. Thus, for example, when the stems in a region are 0.05 centimeters apart, the regions can be 0.5 centimeters apart. In other implementations, the stems are 2, 50, 300, or more times the distance between the center of the stems. In some embodiments, the regions 114 may be continuous in one direction such as ribbons running down-web in a zig-zag or straight line configuration.

The inter-regions 116 may include loop structures for locking with the stems 112, or may expose a portion of the web 110 that is unsuitable for locking with the stems 112. In implementations in which the web 110 itself contains loop structures, such as woven and non-woven fibers, then the inter-regions 116 may provide a location for locking the stems 112. In addition, the stems 112 can be configured to lock with the opposite side 119 of the web 110, or with the scrim as discussed above.

While various materials and constructions of the web 110 are disclosed in U.S. Ser. No. 09/257,447, now abandoned, the preferred material is the nonwoven material disclosed above for the first nonwoven web.

Figure 16:
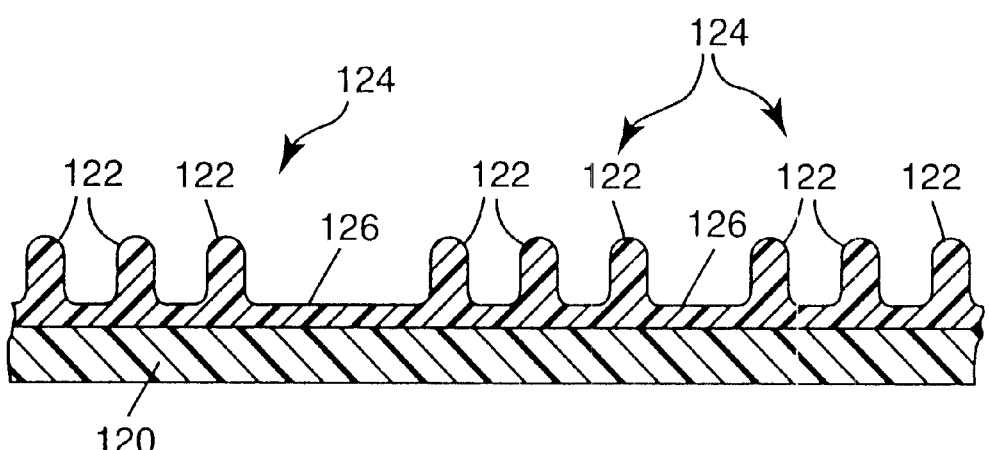
FIG. 16 is a cross-sectional side view of a plurality of regions of stems configured and arranged in accordance with another embodiment of the invention.

FIG. 16 shows a web 120 having stems 122. In contrast to FIG. 15, in FIG. 16 the thermoplastic material forming the stems 122 is continuous or substantially continuous between the regions 124, and web 120 and stems 122 may be of the same material. Thus, inter-regions 126 comprise a thin film of the thermoplastic material overlying the web 120. However, it will be noticed that in both FIG. 15 and FIG. 16, the inter-regions 116, 126 do not contain any stems. Even when the inter-regions 126 contain thermoplastic material, such as in FIG. 16, the inter-regions 126 preferably do not contain stems 122. In specific embodiments, the web 120 is elastic and the inter-regions 126 are sufficiently thin so that the inter-regions may be stretched and severed as the web 120 is stretched. In another embodiment, the web is a thermoplastic material in which a portion was reshaped into stems in discrete areas on at least one surface.

Figure 17:
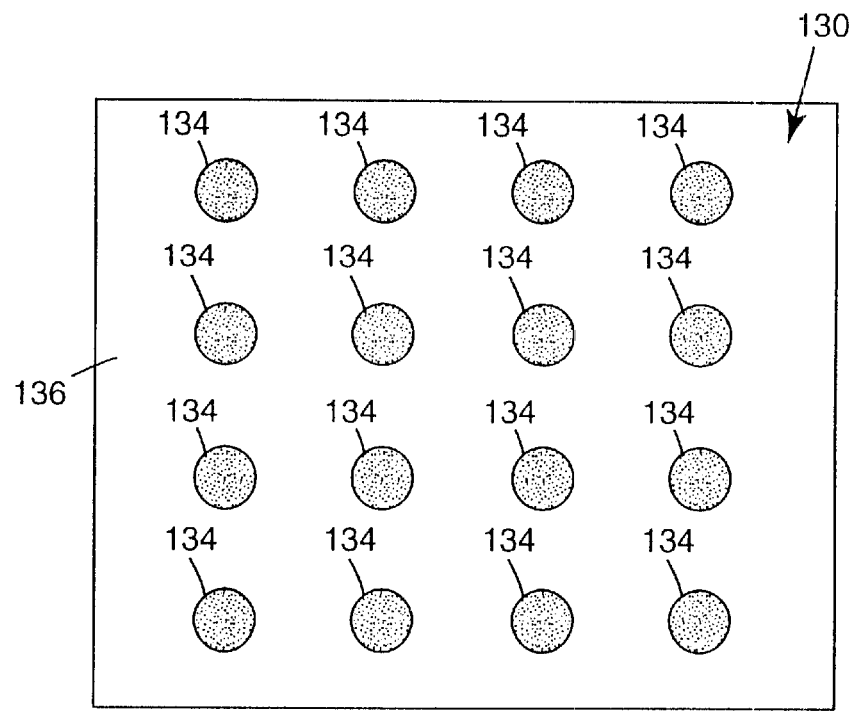
FIG. 17 is a top plan view of a plurality of regions of stems in accordance with yet another embodiment of the invention.
Figure 18:
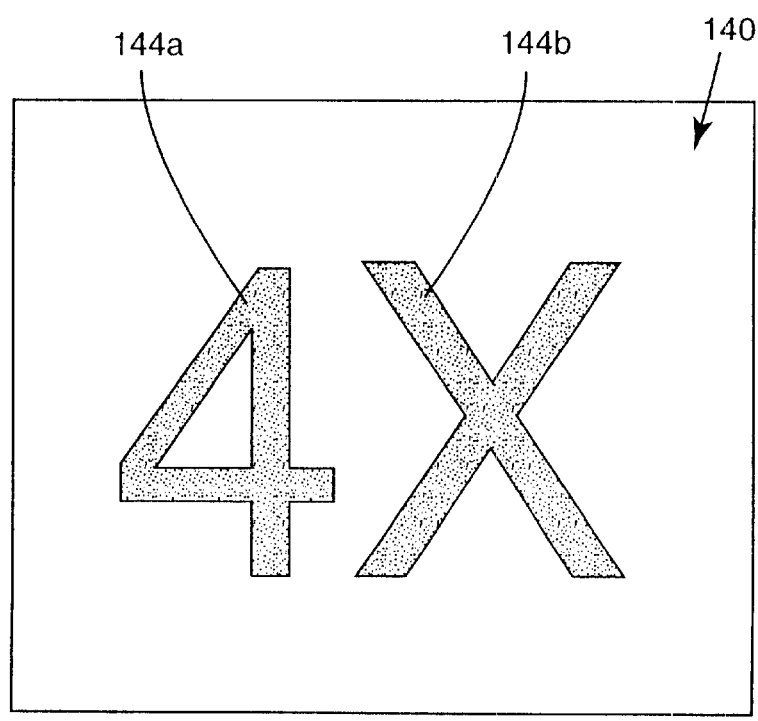
FIG. 18 is a top plan view of a plurality of regions of stems in accordance with yet another embodiment of the invention.

In FIGS. 17 and 18, two embodiments of the invention are shown in which the stems are positioned in distinct regions. In FIG. 17, the web 130 is shown with stems arranged in generally circular discrete regions 134 (individual stems are not shown). Each region 134 contains at least 3 stems, and preferably at least 10 stems, more preferably at least 50 stems. The inter-region 136 between the regions 134 does not contain any stems. In FIG. 18, the web 140 has stems arranged in distinct regions 144a, 144b, the regions having an ornamental configuration depicting the letters "4X".

In the inventive method, discrete quantities of the polymeric material may be provided by extruding intermittent quantities of molten polymer onto the web. The quantities are subsequently fused to the web and formed into stems. Alternatively, discrete quantities or spots of polymeric material may be provided by one or more rotating cutting blades. Additionally, the polymeric material may be provided as either bands or as continuous stripes that run across the major surface of the web.

Hooks can be formed in the stems by capping the stems to form mushroom heads as disclosed in U.S. Pat. No. 5,077,870, incorporated herein by reference, or by bending them. The tips of the stems are contacted with a heated surface to alter the shapes of the stems.

The stems may also be shaped to provide directional hooking capability. Such directional hooks may be used to give directional stability to a hook and loop fastening construction by providing fastening in a selected direction and releasing capability in the opposite direction. The directional stems can be made by pressing the polymeric material onto a tool having a plurality of holes that are angled or tilted in the same direction or in multiple directions arranged in various configurations down-web or cross-web. Stems can be tilted down-web and cross-web, and the patches or regions of stems can be arranged in rows down-web or cross-web or other configurations, such as hexagons, circles, or graphical patterns as shown in FIG. 18.

The holes in the tool can be formed with a laser and can be drilled at various angles such as, for example, 45° or 60°, with respect to the surface or tangent of the tool. The methodology of laser drilling of a thermoset tool is described in U.S. Pat. No. 5,792,411, incorporated herein by reference, and includes machining a tool surface with laser energy to produce a plurality of geometric structures in the substrate. Each of the geometric structures corresponds to a position in which a stem is formed. The stems formed by such a tool do not have to be capped to engage a loop surface since they are tilted. The resulting fastener surface with tilted stems permits the inventive web to be cinched tighter by pulling to release mechanical engagement of the stems and then releasing to achieve mechanical engagement. The stems may be angled in more than one direction. When the hooks are angled in more than one direction, the resulting mechanical engagement with a loop material is resistant to lateral slippage.

FIG. 19 shows a web 150 being manufactured on an apparatus 151. The apparatus 151 is used to make stems 152 on the web 150. The stems 152 are arranged in discrete patches or regions 154. Apparatus 151 includes a source 153 of polymeric material. The source 153 preferably heats the polymeric material to a melting point and then deposits the melted polymeric material on the web 150 as discrete portions 155. In the embodiment shown, source 153 includes an extruder that extrudes the polymeric material under pressure onto the web 150.

The discrete portions 155 move along the web 150 until they come in contact with tool roll 156. Tool roll 156 has a continuous cylindrical tooled surface 157 containing a plurality of cavities (not shown) configured to form the stems. These cavities are optionally evacuated by an external vacuum source (not shown). As the discrete portions 155 of polymeric material come in contact with surface 157 of the cylindrical tool roll 156, the portions 155 are simultaneously pressed into the cavities and fused to the web 150.

In the embodiment shown, a casting roll 158 provides pressure against the back side of the web 150 as the polymeric material cools, thereby assisting in pressing the polymeric material into the cavities in tooled surface 157 of tool roll 156 and fusing of the polymeric material to the web 150. The web 150 conforms to the tool roll 156 until release point 159 is reached, at which point the web 150 is pulled away from tooled surface 157 and the solidified polymeric material is stripped from the tool roll 156, exposing the newly formed stems 152. In this embodiment, each discrete portion 155 of the polymeric material forms a separate distinct patch or region 154 of stems 152. The bond between the substrate 150 and patch or region 154 may be enhanced by adhesives, tie layers or surface treatment within the skill of the art.

It is within the skill of the art to select operable temperatures for the apparatus. In experiments leading to this invention, rolls 156 and 158 were not temperature controlled. A broad temperature range would be useful; although temperatures that are too high may adversely affect the capability of the stems to release from the tooled surface 157.

By varying the position and size of the polymeric portions 155, the final configuration and placement of the stems can be controlled and manipulated. Large polymeric portions correspond to large regions, and small polymeric portions correspond to small regions. In one embodiment of the invention, the source 153 deposits the polymeric portions 155 in continuous lines or stripes down the web, such as lines in a zigzag orientation. The resulting web 150 has one or more continuous bands of stems running along its length. In another embodiment, source 153 deposits the polymeric portions 155 in a series of cross-web lines. These cross-web lines result in regions 154 of stems 152 extending in cross-web bands along the length of the web.

The source 153 of polymeric material may include a plurality of separate nozzles for application of the polymeric material to the web. In one implementation, the polymeric material is extruded from a series of nozzles controlled by solenoid valves, each nozzle being independently operated. Depending upon the desired final position of the regions of stems, individual nozzles are turned on and off, for example by a timer, in order to properly place the polymeric material. It will be appreciated that the nozzles can deposit one or more than one type of polymeric material. Source 153 may also be a screen printer.

Referring to FIG. 20, another method is shown for making discrete regions of stems. FIG. 20 shows a web 160 being manufactured on an apparatus 161 similar to that shown in FIG. 19. Apparatus 161 includes a source 163 of polymeric material. The source 163 releases polymeric material into the path of a revolving blade 167. The blade 167 cuts and disperses the polymeric material onto the web 160. In a specific embodiment, the blade 167 is between 1 and 4 inches long and revolves at between 500 and 1000 rotations per minute. The revolving blade 167 cuts the polymeric material, which is deposited onto the web 160 and subsequently formed into a plurality of stems 162. The polymeric material may be dispersed as generally round particles, long strands, or numerous other shapes and sizes depending upon the blade speed, polymeric material viscosity, and other properties. The polymeric material moves along the web 160 as discrete portions 165 until it comes in contact with tool roll 166. Tool roll 166 has a continuous cylindrical tool surface 169 containing a plurality of cavities (not shown) configured to form the stems 162 in regions 164. As the discrete portions 165 of polymeric material come in contact with the tool roll 166, the portions 165 are simultaneously driven into the cavities and fused to the web 160, then cooled to a non-molten state.

Figure 21:
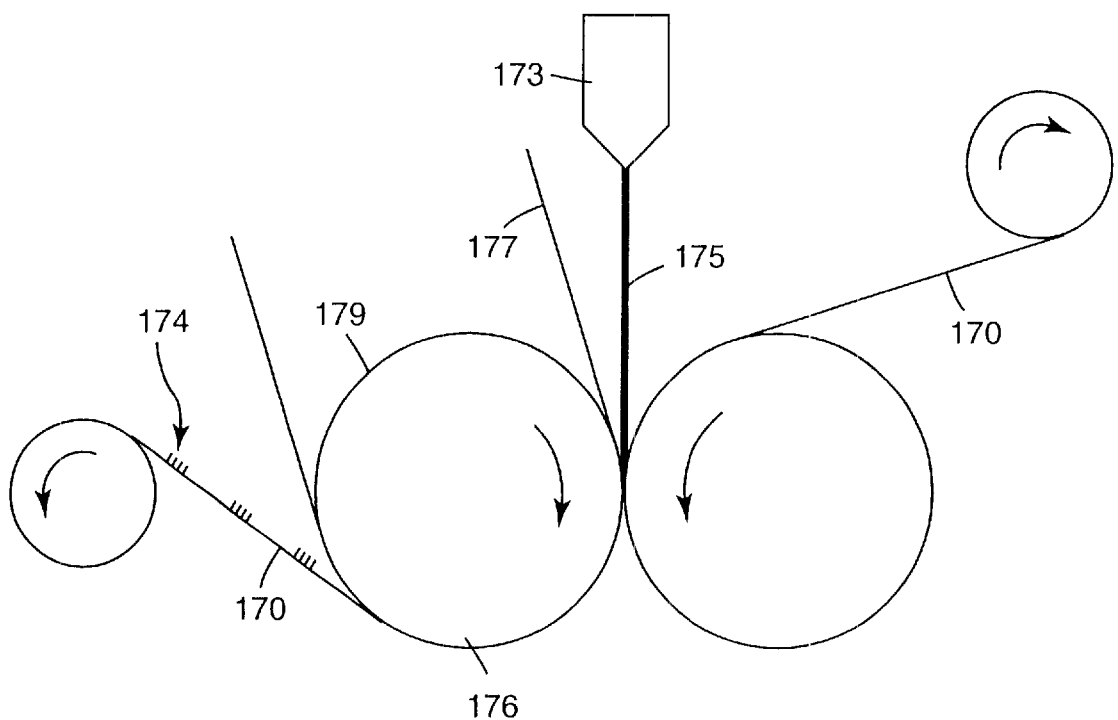
FIG. 21 is a schematic diagram of an apparatus for use in a third method of making a stemmed web in accordance with the invention, using a mask to distribute stem-forming material onto the web.

The method shown in FIG. 21 includes providing a polymeric web 170, a polymeric material from source 173, and a tool roll 176 having a tooled surface 179. The tooled surface 179 has a plurality of stem-forming holes. The tooled surface 179 of the tool roll 176 is covered with mask 177 that covers all but discrete portions of the surface 179. Polymeric material 175 is applied to the mask covered surface of tooled roll 176. Optionally, material 175 is applied to web 170 and pressed against mask covered tool surface 179 under pressure to form regions of stems on the surface of the web 170. These discrete portions correspond to the regions 174 of stems. Regions 174 form because only these areas come in contact with the masked surface of tool 176 in the nip between the two rollers to form the stems. Optionally, polymeric material 175 may be more than one layer.

The tips of the tilted stems, if not capped, are preferably sufficiently sharp to penetrate relatively dense loop materials, thus broadening the selection of loop materials. The inventive webs having tilted stems can be tightened or cinched by dragging the end of the web, instead of completely disengaging it from the mating or loop material.

The inventive webs may use less raw material for forming the stem or hook side, since the whole surface is not covered with hooks or stems. They may also have the advantages of gradient fastening (to tighten or loosen) and dual-sided web functionality (both sides functional).

The stemmed webs of this invention can be used in virtually any application as other stemmed webs, and can find particular utility in the construction of compression wrap articles, roll gauze or bandages, which can be used in orthopedic or wound care applications. For example, elastic fasteners can be used as elastic wraps to secure cables, orthopedic articles, diapers, athletic protective devices, clothing or packaging materials. Medical wraps or bandages can be made to possess the strength, elasticity, and fastening properties required for a particular application without the disadvantages associated with the use of cohesive and adhesive medical wraps and bandages. Cohesive and adhesive medical wraps typically do not allow for easy removal, and are difficult to adjust once they have been applied. For example, adhesive medical wraps can be difficult to either tighten or loosen once they have been applied to a patient.

Figure 22:
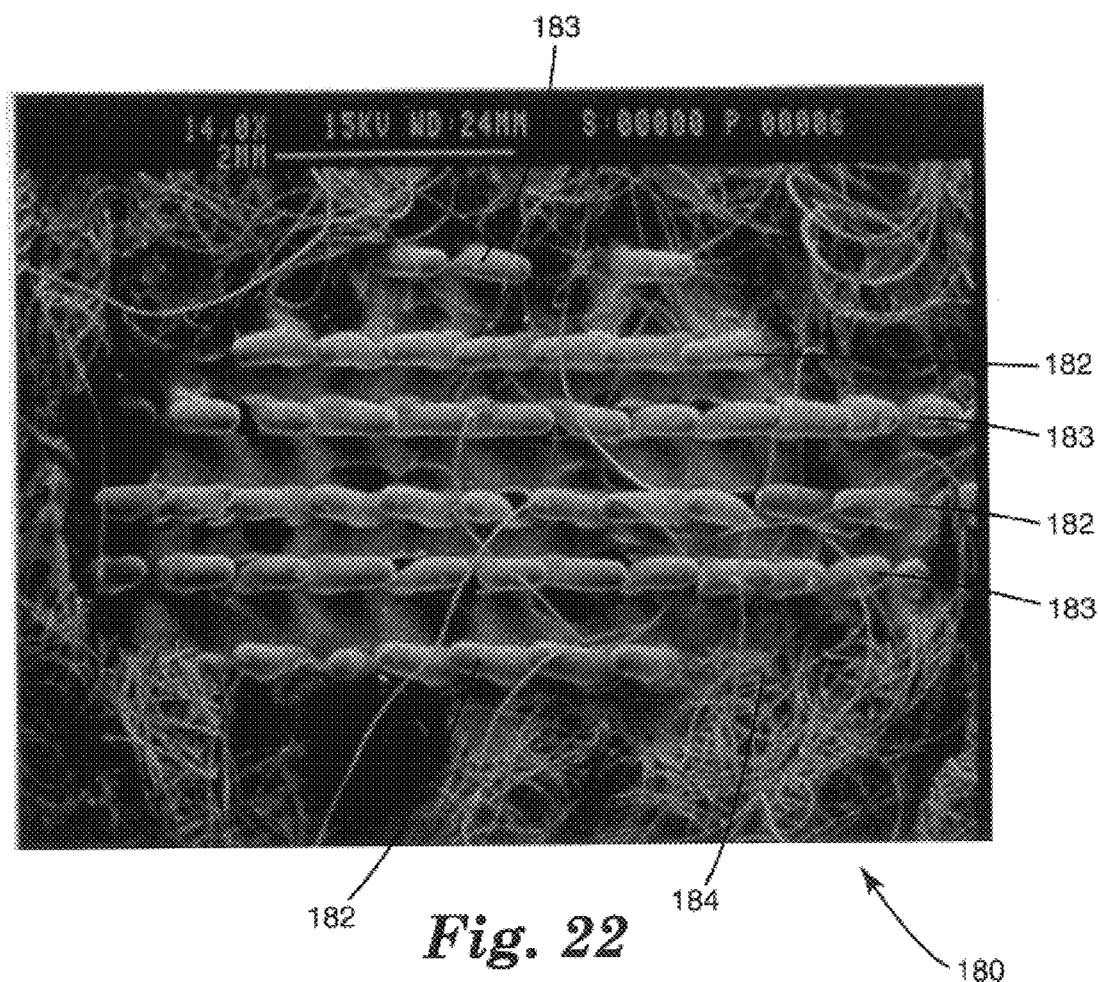
FIG. 22 is a photomicrograph of a region of stems configured and arranged in accordance with an implementation of the invention.

Referring to FIG. 22, a photomicrograph is depicted showing a portion of a web 180 having a patch or region 184 containing a plurality of stems 182, 183. As is apparent in FIG. 22, the stems of the embodiment shown are oriented or tilted substantially in two directions, with the stems 182 oriented opposite to the stems 183. The opposite orientation of the stems 182, 183 allow the region 184 to provide holding force in two different directions.

In the following examples, all parts, ratios and percentages are by weight unless otherwise indicated. The following test materials and methods were used:

| Materials Used | |
|---|---|
| Material | Description |
| Aspun ™ 6806 | A low density polyethylene, melt index 105 g/10 min., available from Dow Chemical Company, Midland, Michigan. |
| Morthane ™ 440-200 | A polyurethane, melt index 25 g/10 min., available from Morton International, Seabrook, New Hampshire. |
| Substrate A | A multi-layer web as described in Example 1, below. |
| Substrate B | Warp Knit Nylon Cloth, Style #4246, 93.5 g/m$^2$, available from Alexander Fabrics, Libertyville, Illinois. |
| Substrate C | Miratec ™ 5609, 41 g/m$^2$ spunlaced polyethylene terephthalate, available from Polymer Group, Inc., Mooresville, North Carolina. |
| Substrate D | Millilock ™, 82 g/m$^2$ knitted loop, available from Milliken and Company, Spartanburg, South Carolina. |
| Substrate E | Fiberweb ™, 24 g/m$^2$ spunbond nonwoven polypropylene, available from BBA Nonwovens, Simpsonville, South Carolina. |
| Substrate F | Microporous polypropylene membrane available from Minnesota Mining and Manufacturing Company, St. Paul, Minnesota. |
| Substrate G | Orange construction paper. |
| Escorene ™ 3505 | A polypropylene, melt index 400 g/10 min., available from Exxon Chemical Company, Baytown, Texas. |

Examples 17 AND 18

Examples 17 and 18 demonstrate using breathable elastic substrates and bi-directional stem configurations.

In Example 17, Substrate A, an elastic breathable substrate, was first made as follows. A blown micro-fiber pressure sensitive adhesive (BMF-PSA) web made of HL-8156 block copolymer pressure sensitive adhesive (PSA) (HB Fuller Company, St. Paul, Minn.) was prepared by processing the solid adhesive through a grid melt system (J&M Laboratories, Inc. Dawsonville, Ga.) and then through a 30.5-cm wide blown microfiber (BMF) die at a rate of 2.0 kg/hr. The grid melt system had a hopper holding capacity of 40 kg and a melting capacity of 40 kg/hr. The melt pump volume was 1.68 cc/rev and the process temperature was 135° C. The BMF-PSA was discharged from a melt blowing die having circular smooth surface orifices (8/cm) positioned approximately 10 cm above a vertical nip point formed by two 40.6-cm wide silicone coated rolls.

A layer of polypropylene spunbond nonwoven material (15 g/m$^2$ base weight, Product No. 150A0299A, First Quality Products, Inc., McElhattan, Pa.) was fed around the bottom roller of the nip up-stream of the BMF die. At the same time, a second layer of polypropylene spunbound nonwoven material (Product No. 150A0299A), a weft-inserted polyester scrim (Product No. 924864, Milliken Company, Spartanburg, S.C.), and a layer of 280 denier Glospan™ elastic filaments (Globe Manufacturing Company, Gastonia, N.C.) were fed around the top roller of the nip from the "down-stream" side of the BMF die. The polyester scrim had 18×40 denier yarns/2.5 cm in the machine direction and 9×1 5 denier yarns/2.5 cm in the cross-web direction.

The elastic filaments had a cross-web density of 2.75 filaments/cm and a stretch ratio of 2:1. The filaments were situated on top of the nonwoven layer so that the BMF-PSA was blown onto the "up-stream" layer of nonwoven and then contacted the elastic filaments to bond the entire composite together. The nip force was 418N across a 30.5-cm wide composite and the nip speed was 9.1m/min. After passing through the nip, the substrate construction was nonwoven/BMF-PSA/elastic filaments/nonwoven with a first side near the BMF inner layer and a second side near the elastic filament layer. Upon exiting the nip, the substrate was allowed to relax, thereby causing the filaments to contract. It was observed that the low baseweight nonwoven outer layers ("coverwebs") and the flexible BMF-PSA fibers were easily buckled into soft pleats. The resulting shirred elastic substrate was collected on a cardboard roll.

A stem formable material, Aspun™ 6806, was passed through the grid melt system at a rate of 0.5 kg/hr and then through a 30.5-cm wide die having 16 bead tip nozzles. The bead tip nozzles had a circular exit diameter of 1.5 mm and were pneumatically pulsed at a frequency of 5 pulses per second. The melt pump volume was 1.68 cc/rev and the process temperature was 205° C. The molten Aspun 6806 material was discharged from the die directly onto Substrate A in spots. The web was then conveyed approximately 20 cm into a vertical nip formed by two 40.6-cm wide silicone coated rolls at a speed of 4.6 m/min. The nip force was 1.7 kN across a 30.5 cm wide web. The first roll had a tooled surface that contained cavities with diameters of about 0.25 mm, depths in excess of about 0.80 mm and spacing of about 0.635 mm, resulting in a stem array having a stem density of about 248 stems/cm$^2$ (about 1600 stems/in$^2$). The cavities were angled at 45 degrees from the tangent of the roll surface in alternating directions. The second roll had a smooth surface. The layer of elastic Substrate A described above was fed around the smooth roll of the nip with the second side facing the surface of the smooth roll. The spots or discrete regions of stem-formable material faced the tooled surface and contacted the substrate as it entered the nip. The resulting web was removed from the tooled surface to yield a stem-surfaced web with rod-like stem projections on the regions of stem formable material, each stem having a diameter of approximately 0.25 mm and a height of about 0.6 mm, extending from the surface of the web. The stems were in rows that were either +45 degrees or −45 degrees from normal in the plane normal to the web surface and parallel to the cross-section of the web in the down-web direction. Each region had a somewhat circular shape and an area of between 0.2 and 0.3 cm$^2$ and contained between 50 and 75 stems. Each region was separated from neighboring regions by between approximately 1.0 and 1.5 cm.

The stem-surfaced web was breathable (ie. porous) and elastic. When wrapped around an object in either direction, and fastened by pressing both sides together, the web had a cinching action suitable as a compression wrapping construction. Patches of hooks or stems have a more rigid base than stems or hooks positioned on an elastic substrate and can engage better with loops.

Example 18 was made as Example 17 except the BMF-PSA in the substrate was pumped through the grid melt system at a flow rate of 4.0 kg/hr and the polyester scrim was not included in the construction. The resulting laminate exhibited some cohesion and the resulting stem-surfaced web had substantially no lateral slippage when wrapped around an object and fastened to itself.

Examples 19–21

Examples 19–21 demonstrate constructions having alternate shapes of stem regions. Examples 19–21 have stem regions that are continuous in the cross-web direction and are substantially perpendicular to the down-web direction of the web.

Example 19 was made in a manner similar to Example 17 and with the same substrate as Example 17. However, the stem formable material was deposited using a small orifice die tip with a single row of circular smooth surface orifices (8/cm) rather than bead tip nozzles. The small orifice die tip had circular smooth surface orifices (8/cm) with 0.51 mm diameter. The stem formable material was deposited at a rate of 0.7 kg/hr.

The resulting stem-surfaced regions were cross direction stripes approximately 0.5 cm wide and separated approximately 2 cm from each other. Each region had on average approximately 8 stems across its width and 16 rows/cm cross web. The webs were very ductile and breathable, and fastened to themselves when wrapped in either direction around an object.

Example 20 was made as Example 19 except a slot tip with a gap of 0.25 mm was used in place of the multiple orifice die tip and the flowrate of the stem formable material was 0.8 kg/hr. The resulting stem-surfaced regions were cross direction stripes approximately 0.6 cm wide and separated approximately 2 cm from the nearest neighboring stemmed regions. The webs were very ductile and breathable, and fastened to themselves when wrapped in either direction around an object.

Example 21 was made as Example 19 except a traversing bead tip nozzle was used in place of the intermittent stationary die tip. The stem formable material was deposited at 1.8 kg/hr and traversed cross web at a frequency of 6 stripes per second. The substrate was moving at a speed of 9.1 m/min. The resulting stem-surfaced regions were cross-web direction stripes approximately 0.3 cm wide and separated approximately 1.5 to 2.0 cm from each other. The webs were very ductile and breathable, and fastened to themselves when wrapped in either direction around an object.

Example 22

Example 22 demonstrated a construction having an inelastic substrate and another process of making discrete regions of stem formable material.

A stem formable material, Morthane™ 440, was passed through a glue gun (available as PAM 600 Spraymatic™ from Fastening Technology, Inc, Charlotte, N.C.). The circular exit of the glue gun was approximately 1.5 mm diameter and the process temperature was about 232° C. The molten material was discharged from the gun in discrete amounts as the gun was repeatedly triggered on and off at a frequency of 1.0 pulse per second. The discrete amounts or spots of material were deposited directly onto Substrate B. The web was then conveyed approximately 20 cm into a vertical nip point formed by two 40.6-cm wide silicone coated rolls at a speed of 4.6 m/min. The nip force was 1.7 kN across a 30.5 cm wide web. The first roll had a tooled surface that contained cavities with diameters of about 0.25 mm, depths in excess of about 0.80 mm and spacing of about 0.635 mm, resulting in a stem array having a stem density of about 248 stems/cm$^2$ (about 1600 stems/in$^2$). The cavities were angled at 45 degrees from the tangent to the roll surface in the machine direction and were tilted in alternating directions in every other row. The second roll had a smooth surface.

Substrate B was fed around the smooth roller of the nip with the second side facing the surface of the smooth roll. The stem formable material faced the tooled surface and contacted the substrate as it entered the nip. The resulting web was removed from the tooled surface to form a stem-surfaced web with rod-like stem projections on the regions of stem formable material, each stem having a diameter of approximately 0.25 mm and a height of about 0.6 mm, extending from the surface of the film. The stems were in rows that were either +45 degrees or −45 degrees from vertical in the plane vertical to the web surface and parallel to the cross-section of the web in the down-web direction. Each region had a somewhat circular shape and an area of between 1.0 and 1.5 cm$^2$ and contained between approximately 240 and 370 stems. Each region was separated from neighboring regions by between approximately 4 and 5 cm. The stem-surfaced web was breathable and flexible.

Examples 23–27

Examples 23–27 demonstrate construction having various inelastic substrates that were both substantially and substantially non-breathable.

Example 23 was made in a manner similar to Example 17 except the substrate was changed and a different die tip was used. The substrate was Substrate C, an inelastic nonwoven web, and the die tip was a small orifice die tip used in Example 19. The resulting stem-surfaced web had stem regions similar to those described in Example 19. The stem-surfaced web was breathable, flexible, and able to fasten onto itself in either direction of wrap.

In Example 24, the discrete stem-surfaced film was made as in Example 22 except the substrate was Substrate D. The stem-surfaced web was breathable, flexible, and able to fasten onto itself in either direction of wrap.

Example 25 was made in a manner similar to Example 17 except the materials were different and the tooled surface was changed. The substrate was Substrate E, spunbond polypropylene, and the stem formable material was Escorene™ 3505. The tooled surface contained cavities with diameters of about 280 micrometers (11 mils), depths in excess of about 2.5mm (100 mils) and spacing of about 813 micrometers (32 mils), resulting in a stem array having a stem density of about 140 stems/cm$^2$ (900 stems/in$^2$). The cavities were perpendicular to the tangent of the roll surface. The second roll had a smooth surface. The layer of Substrate E was fed around the smooth roller of the nip with the second side facing the surface of the smooth roll. The discrete regions of stem-formable material faced the tooled surface and contacted the substrate as it entered the nip. The resulting web was removed from the tooled surface to yield a stem-surfaced web with rod-like stem projections on the regions of stem formable material, each having a diameter of approximately 0.3 mm and a height of about 0.7 mm, extending from the surface of the web. Caps were formed on the stems of the stem-surfaced web by exposing the stemed surface to a roll heated to 138° C. (280° F.). The stem-surfaced web was breathable, flexible, and able to fasten onto itself.

Example 26 was made in a manner similar to Example 25 except the substrate was Substrate F, a microporous membrane, and the stems were not subsequently capped. The stem-surfaced web was less breathable and less flexible than Example 25.

Example 27 was made in a manner similar to Example 25 except the substrate was Substrate G, paper, and the stems were not subsequently capped. The stem-surfaced web was less breathable and less flexible than Example 26.

Example 28

Example 28 demonstrates another method of making discrete regions.

Stem-formable material, Dowlex™ 3445 polypropylene, was fed into a single screw extruder having a diameter of about 32 mm (1.25 inch), an L/D of 24/1, a screw speed of 15 rpm and a temperature profile that rose up to approximately 215° C. The thermoplastic Dowlex 3445 material was passed through the extruder and continuously discharged at a pressure of at least 0.7 MPa (100 psi) through a heated neck tube and into one port in a three-layer adjustable vane feed block (CLOEREN™ Model 86-120-398, available from Cloeren Incorporated. of Orange, Tex., and setup for two layers) that was mounted on a 25.4 cm (14 in) wide film die (CLOEREN™ EBR III 96-151 also available from Cloeren Co.). An elastic material, Vector™ 4111, was fed into a second single screw extruder having a diameter of about 64 mm (2.5 in), an L/D of 24/1, a screw speed of 5 rpm and a temperature profile that steadily increased to approximately 215° C. The elastic material was then continuously discharged at a pressure of at least about 1.4 MPa (200 psi) through a heated neck tube and into a second port in the three-layer feed block. The feed block and die were set at approximately 215° C. The die gap was set at approximately 0.5 mm (20 mils). The two layer molten construction was discharged from the die and drop fed at about 1.5 m/min (5 fpm) into a nip formed by two rolls having a nip pressure of about 0.2 KPa (30 psi). The first roll had a tooled surface that was heated to 55° C. and contained cavities with diameters of about 280 micrometers (11 mils), depths in excess of about 2.5mm (100 mils) and spacing of about 813 micrometers (32 mils), resulting in a stem array having a stem density of about 140 stems/cm$^2$ (900 stems/in$^2$). A mask in the form of a Teflon™ netting having square diamond shaped openings of 7×7 mm, was placed over the tooled surface such as to cover some of the holes in a screen pattern. The second roll had a chrome-plated surface that was also heated to 55° C. The thermoplastic material of the construction faced the tooled surface and the elastic layer faced the chrome surface. The resulting cast film was removed from the tooled surface to form a stem-surfaced film with diamond shaped regions with rod-like stem projections, each having a diameter of approximately 300 micrometers and a height of about 700 micrometers, extending from the surface of the film. Each region was separated by an indentation.

When the stem-surfaced film thus produced was stretched, the diamond-shaped regions separated from each other as the stem-formable material broke (fractured) where the indentations were. The resulting film became elastic.

Example 29

Example 29 demonstrates another method of making discrete regions.

Stem-formable material, Dowlex™ 3445, was fed into a single screw extruder equipped with a die having curved lip and a 6.3 mm (0.25 in) diameter opening, from which molten material was discharged. The material dropped into a flying cutter device. The device had a metal rod with a diameter of 12.5 mm (0.5" in) and an attached stainless steel blade attached along the shaft at one end with two screws.

The blade extended outward from the rod perpendicular to the surface of the rod and parallel to the long axis of the rod. The shaft was rotated along its long axis by a motor at about 700 revolutions per minute. As the blade rotated, it deflected against the lip of the die, scraping a piece of the molten material. When the blade cleared the die, the blade sprang and threw the molten material onto a moving substrate, Substrate G passing into a nip arrangement described in Example 1. The web carried molten material, spots of approximately 3 mm in diameter, into the nip with the spots of polypropylene material next to the tooled surface. Nip pressure forced the molten material into the holes of the tooled surface, where it solidified. At the same time polymer melt entangled with the fibrous surface of the web, forming effective bonding. The resulting stem-surfaced film is breathable and flexible.

As various changes could be made in the above constructions and methods without departing from the scope of the invention as defined in the claims, it is intended that all matter contained in the above description or shown in the accompanying drawings be interpreted as illustrative and not in a limiting sense.

What is claimed is:

1. A laminated elastic composite, comprising:
   a first nonwoven web layer having a machine direction and a cross direction;
   a scrim layer adjacent to the first nonwoven web layer comprising spaced-apart, nonelastic filaments oriented substantially in the machine direction that are substantially perpendicular to spaced-apart filaments oriented substantially in the cross-direction;
   an elastic layer adjacent to the scrim layer comprising a series of substantially parallel, spaced-apart elastic filaments wherein the length of the elastic filaments are oriented substantially in the machine direction;
   a fibrous adhesive layer adjacent the elastic layer, and
   a second nonwoven web layer adjacent to the fibrous adhesive layer;
   wherein at least one of the nonwoven web layers comprises loops, and further wherein the fibrous adhesive layer comprises a melt-blown fibrous adhesive layer comprising multilayer fibers, said fibers comprising one or more layers of a pressure-sensitive adhesive and one or more layers of a non-adhesive polymer.

2. A laminated elastic composite according to claim 1, wherein the first nonwoven layer is a nonwoven material selected from the group consisting of a melt blown nonwoven material, a spunbond nonwoven material, a spun laced nonwoven material, a staple carded web, an air laid web and a wet laid web, and wherein the second nonwoven layer is a nonwoven material selected from the group consisting of melt blown nonwoven materials, spunbond nonwoven materials, spun laced nonwoven materials, staple carded webs, air laid webs and wet laid webs.

3. A laminated elastic composite according to claim 1, wherein at least one of the first nonwoven layer and the second nonwoven layer comprises a spun bond nonwoven material.

4. A laminated elastic composite according to claim 1, wherein the spacing of the elastic filaments is in the range of about 1–10 filaments/cm in the cross direction.

5. A laminated elastic composite according to claim 1, wherein the melt blown fiber adhesive layer comprises three-layer fibers comprising two outer layers of a pressure-sensitive adhesive and one inner layer of a non-adhesive polymer.

6. A laminated elastic composite according to claim 1, wherein the laminated composite is cohesive.

7. A laminated elastic composite according to claim 1, wherein the scrim has in the range of 5–30 filaments/2.5-cm in the machine direction and in the range of about 5–30 filaments/2.5-cm in the cross-direction.

8. A laminated elastic composite according to claim 1, further comprising a pressure-sensitive adhesive layer on the outer surface of one of the nonwoven layers.

9. A laminated composite according to claim 1, further comprising a plurality of hooks formed along a surface of the composite for releasable engagement with the loops to fasten the composite in use.

10. A laminated composite according to claim 9, wherein the first nonwoven web includes a plurality of discrete regions, the plurality of hooks being formed by a plurality of stems extending from each discrete region, wherein the plurality of discrete regions are fused to at least the first major side of the web.

11. A laminated composite according to claim 10, wherein the plurality of stems are comprised of a thermoplastic material selected from the group consisting of: polyurethane, polyolefins, polystyrenes, polycarbonates, polyester, polymethacrylate, ethylene vinyl acetate copolymers, ethylene vinyl alcohol copolymers, polyvinylchloride, acrylate modified ethylene vinyl acetate polymers, and ethylene acrylic acid copolymers.

12. A laminated composite according to claim 10, wherein the discrete regions cover between 5 and 25 percent of a major surface of the first nonwoven web.

13. A laminated composite according to claim 10, wherein the first nonwoven web defines a localized plane, and the plurality of stems are oriented at a plurality of angles to the localized plane.

14. A laminated composite according to claim 10, wherein one or more of the stems is shaped to provide directional hooking capability.

15. A laminated composite according to claim 10, wherein the discrete regions are separated an average of approximately 0.05 and 30 centimeters from one another.

16. A laminated composite, comprising:
    a first nonwoven web layer;
    a scrim layer adjacent to the first nonwoven web layer comprising spaced-apart, non-elastic filaments oriented substantially in the machine direction that are substantially perpendicular to spaced-apart filaments oriented in the cross-direction; and
    a fibrous adhesive layer adjacent the scrim layer;
    wherein the fibrous adhesive layer comprises a melt-blown fibrous adhesive layer comprising multilayer fibers, said fibers comprising one or more layers of a pressure-sensitive adhesive and one or more layers of a non-adhesive polymer.

17. A laminated elastic composite according to claim 16, wherein the melt blown fiber adhesive layer comprises three-layer fibers comprising two outer layers of a pressure-sensitive adhesive and one inner layer of a non-adhesive polymer.

18. A laminated composite according to claim 16, further comprising:
    a pressure-sensitive adhesive layer adjacent to the fibrous adhesive layer.

19. A laminated composite according to claim 16, wherein the nonwoven layer comprises a nonwoven material selected from the group consisting of a melt blown nonwoven material, a spunbond nonwoven material, a spun laced nonwoven material, a staple carded web, an air laid web and a wet laid web.

20. A laminated composite according to claim 16, wherein the nonwoven layer comprises a spun bond nonwoven material.

21. A laminated composite according to claim 16, wherein the scrim comprises a woven scrim.

22. A laminated composite according to claim 16, wherein the scrim has in the range of about 5–30 filaments/2.5-cm in the machine direction and in the range of about 5–30 filaments/2.5-cm in the cross direction.

23. A laminated composite according to claim 16, wherein the laminated composite is cohesive.

24. A laminated composite, comprising:

a scrim layer comprising spaced-apart filaments oriented substantially in the machine direction that are substantially perpendicular to spaced-apart filaments oriented substantially in the cross-direction;

an elastic layer comprising a series of substantially parallel, spaced-apart elastic filaments wherein the elastic filaments are oriented substantially in the machine direction; and a fibrous adhesive layer adjacent the elastic layer;

wherein the scrim layer comprises loops, and farther wherein the fibrous adhesive layer comprises a meltblown fibrous adhesive layer comprising multilayer fibers, said fibers comprising one or more layers of a pressure-sensitive adhesive and one or more layers of a non-adhesive polymer.

25. A laminated composite according to claim 24, further comprising a plurality of hooks formed along a surface of the composite for releasable engagement with the loops to fasten the composite in use.

26. A laminated composite according to claim 24, wherein the composite is cohesive.

27. A laminated composite according to claim 24, wherein the scrim has in the range of 5–30 filaments/2.5-cm in the machine direction and in the range of 5–30 filaments/2.5-cm the cross-direction.

28. A laminated composite according to claim 24, further comprising a layer of a pressure-sensitive adhesive on the scrim layer.

* * * * *

UNITED STATES PATENT AND TRADEMARK OFFICE
CERTIFICATE OF CORRECTION

PATENT NO. : 6,503,855 B1
DATED : January 7, 2003
INVENTOR(S) : Menzies, Robert H.

It is certified that error appears in the above-identified patent and that said Letters Patent is hereby corrected as shown below:

Title page,
Item [56], References Cited, OTHER PUBLICATIONS, "Standard Test Method for handle" reference, after "IST 90.2" delete ",". "Corporation, NonWoven Industry," reference, delete "93" and insert in place thereof -- 95 --.
"Chemistry Wente" reference, after "1342" delete ",".

Column 10,
Line 36, after "50" insert -- , --.
Line 40, delete "dic" and insert in place thereof -- die --.

Column 18,
Line 59, after "15 g/m$^2$" insert -- . --.

Columns 25-26,
Table 1, example 5 delete "0.20" and insert in place thereof -- 0.10 --.

Column 35,
Line 37, delete "," and insert in place thereof -- ; --.

Column 38,
Line 2, delete "farther" and insert in place thereof -- further --.

Signed and Sealed this

Twenty-fourth Day of May, 2005

JON W. DUDAS
*Director of the United States Patent and Trademark Office*